US012514569B2

(12) United States Patent
Nejati et al.

(10) Patent No.: US 12,514,569 B2
(45) Date of Patent: Jan. 6, 2026

(54) CAPSULE FOR GASTROINTESTINAL SAMPLING

(71) Applicant: Eli Lilly and Company, Indianapolis, IN (US)

(72) Inventors: Sina Nejati, West Lafayette, IN (US); Rahim Rahimi, West Lafayette, IN (US); Mohit Singh Verma, West Lafayette, IN (US); Jose Fernando Waimin Almendares, West Lafayette, IN (US); Jiangshan Wang, West Lafayette, IN (US)

(73) Assignee: Eli Lilly and Company, Indianapolis, IN (US)

( * ) Notice: Subject to any disclaimer, the term of this patent is extended or adjusted under 35 U.S.C. 154(b) by 740 days.

(21) Appl. No.: 17/785,166

(22) PCT Filed: Dec. 16, 2020

(86) PCT No.: PCT/US2020/065242
§ 371 (c)(1),
(2) Date: Jun. 14, 2022

(87) PCT Pub. No.: WO2021/126925
PCT Pub. Date: Jun. 24, 2021

(65) Prior Publication Data
US 2023/0035768 A1 Feb. 2, 2023

Related U.S. Application Data

(60) Provisional application No. 62/948,428, filed on Dec. 16, 2019.

(51) Int. Cl.
*A61B 5/00* (2006.01)
*A61B 10/00* (2006.01)

(52) U.S. Cl.
CPC .. *A61B 10/0045* (2013.01); *A61B 2010/0061* (2013.01)

(58) Field of Classification Search
CPC ........ A61B 10/0045; A61B 2010/0061; A61B 10/02
See application file for complete search history.

(56) References Cited

U.S. PATENT DOCUMENTS 3,688,763 A 9/1972 Cromarty
4,478,658 A 10/1984 Wittwer
(Continued)

FOREIGN PATENT DOCUMENTS

CN 105043070 11/2015
CN 205316846 6/2016
(Continued)

OTHER PUBLICATIONS

Silver, Mike, 3D Printed Pill Samples Gut Microbiome to Aid Diagnosis and Treatment, TuftsNow, Jul. 24, 2019.
(Continued)

*Primary Examiner* — May A Abouelela
(74) *Attorney, Agent, or Firm* — Jonathan C. Anderson

(57) ABSTRACT

Passive devices for non-invasive gastrointestinal (GI) sampling are disclosed. In some embodiments, a device includes a capsule housing containing an absorbent sampling hydrogel. The capsule may be ingested by a patient and subsequently travel through the GI tract. Once the capsule reaches a desired location in the GI tract, GI fluid may flow into the capsule through a sampling aperture of the capsule. The fluid may be absorbed by and stored within the sampling hydrogel for subsequent analysis, and the absorption of the fluid may cause the sampling hydrogel to expand within the capsule. The capsule may further include a sealing member positioned between the sampling hydrogel and the sampling
(Continued)

aperture, and the expansion of the sampling hydrogel may press the sealing member against the sampling aperture to seal the capsule.

25 Claims, 18 Drawing Sheets

(56) References Cited

U.S. PATENT DOCUMENTS

| | | | |
|---|---|---|---|
| 4,481,952 A * | 11/1984 | Pawelec | A61B 10/00 600/593 |
| 7,449,001 B2 | 11/2008 | Stoltz | |
| 7,684,840 B2 | 3/2010 | Palti | |
| 8,926,526 B2 | 1/2015 | Shuck | |
| 9,724,306 B2 | 8/2017 | Alon et al. | |
| 9,955,922 B2 | 5/2018 | Shuck | |
| 10,172,598 B2 * | 1/2019 | Amoako-Tuffour | A61B 5/07 |
| 10,722,220 B2 | 7/2020 | Jones | |
| 10,980,482 B2 | 4/2021 | Jones | |
| 2007/0161928 A1 | 7/2007 | Sprenkels et al. | |
| 2008/0057086 A1 | 3/2008 | Etter | |
| 2008/0194912 A1 * | 8/2008 | Trovato | A61B 34/72 600/118 |
| 2011/0046458 A1 * | 2/2011 | Pinedo | A61B 5/14546 600/300 |
| 2011/0104068 A1 * | 5/2011 | Garey, Jr. | A61K 49/222 424/9.5 |
| 2013/0034863 A1 | 2/2013 | Papazoglou et al. | |
| 2013/0296738 A1 * | 11/2013 | Swain | A61B 10/04 600/569 |
| 2014/0288398 A1 * | 9/2014 | Simberg | A61B 10/0045 600/309 |
| 2015/0011874 A1 * | 1/2015 | Amoako-Tuffour | A61M 31/002 604/503 |
| 2015/0148604 A1 * | 5/2015 | Gazdzinski | A61B 5/4255 600/109 |
| 2015/0289752 A1 * | 10/2015 | Rachlin | A61B 1/041 600/572 |
| 2016/0038086 A1 | 2/2016 | Wrigglesworth et al. | |
| 2017/0252016 A1 * | 9/2017 | Wrigglesworth | A61B 10/0045 |
| 2017/0252018 A1 | 9/2017 | Wrigglesworth et al. | |
| 2017/0296092 A1 * | 10/2017 | Jones | A61B 5/065 |
| 2018/0049725 A1 | 2/2018 | Jones | |
| 2018/0052084 A1 * | 2/2018 | Jones | G01N 1/405 |
| 2018/0064366 A1 * | 3/2018 | Sweeney | A61B 5/073 |
| 2018/0164221 A1 * | 6/2018 | Singh | A61K 49/0058 |
| 2018/0168490 A1 * | 6/2018 | Jones | A61B 5/7282 |
| 2018/0206769 A1 | 7/2018 | Pak et al. | |
| 2019/0076081 A1 * | 3/2019 | Hyde | A61B 5/4238 |
| 2019/0083073 A1 | 3/2019 | Amoako-Tuffour et al. | |
| 2019/0216443 A1 | 7/2019 | Duan et al. | |
| 2019/0223846 A1 * | 7/2019 | Kerkhof | A61B 10/0045 |
| 2019/0282791 A1 * | 9/2019 | Jones | A61M 31/00 |
| 2019/0343425 A1 * | 11/2019 | Jones | A61B 5/07 |
| 2020/0038000 A1 * | 2/2020 | Wang | A61B 10/02 |
| 2020/0138416 A1 * | 5/2020 | Shalon | A61B 10/0045 |
| 2020/0163656 A1 * | 5/2020 | Velev | A61B 5/150061 |
| 2020/0170937 A1 * | 6/2020 | Jones | C07K 14/52 |
| 2020/0253506 A1 * | 8/2020 | Jones | A61B 10/0045 |
| 2020/0262908 A1 * | 8/2020 | Jones | C07K 16/2839 |
| 2020/0297329 A1 * | 9/2020 | Thelu | A61B 10/0045 |
| 2020/0315540 A1 * | 10/2020 | Jones | A61B 5/4839 |
| 2021/0015428 A1 | 1/2021 | Yangdai et al. | |
| 2021/0121533 A1 * | 4/2021 | Jones | A61M 31/002 |
| 2021/0138213 A1 * | 5/2021 | Jones | A61B 5/073 |
| 2021/0213263 A1 | 7/2021 | Rhodes et al. | |
| 2021/0228157 A1 | 7/2021 | Jones | |
| 2021/0307733 A1 * | 10/2021 | Wang | A61M 31/002 |
| 2021/0386367 A1 * | 12/2021 | Wahl | C12Q 1/18 |
| 2022/0071559 A1 * | 3/2022 | Jones | A61K 31/436 |
| 2022/0119941 A1 * | 4/2022 | Eisaman | H01L 21/041 |

FOREIGN PATENT DOCUMENTS

| | | |
|---|---|---|
| CN | 205672230 | 9/2016 |
| DE | 19801573 | 7/1999 |
| EP | 1530950 | 5/2005 |
| IN | 01551MU2015 | 4/2017 |
| WO | 2017004623 | 1/2017 |
| WO | 2018/133660 A1 | 7/2018 |
| WO | 2018213729 | 11/2018 |
| WO | 2019081539 | 5/2019 |
| WO | 2019203802 | 10/2019 |
| WO | 2020185326 | 9/2020 |
| WO | 2020193267 | 10/2020 |
| WO | 2021126925 | 6/2021 |
| WO | 2021219891 | 11/2021 |

OTHER PUBLICATIONS

Patent Cooperation Treaty International Search Report of the International Searching Authority pertaining to International Application No. PCT/US2020/065242; International Filing Date: Dec. 16, 2020; Date of Mailing: May 27, 2021.
Patent Cooperation Treaty Written Opinion of the International Searching Authority pertaining to International Application No. PCT/US2020/065242; International Filing Date: Dec. 16, 2020; Date of Mailing: May 27, 2021.
Me et al., "Ingetible capsule for detecting labile inflammatory biomartkers in situ," bioRxiv, Feb. 16, 2022, XP480562; doi: https://doi.org/10.1101/2022.02.16.480562.
Bonhoeffer "Alternative Manufacturing Concepts for Solid Oral Dosage Forms From Drug Nanosuspensions Using Fluid Dispensing and Forced Drying Technology." Journal of Pharmaceutical Sciences Nov. 15, 2017; Alternative Manufacturing Concepts for Solid Oral Dosage Forms From Drug Nanosuspensions Using Fluid Dispensing and Forced Drying Technology—Journal of Pharmaceutical Sciences (jpharmsci.org).
Salem "Design of a Microbiota Sampling Capsule using 3D-Printed Bistable Mechanism." Annual International Conference of the IEEE Engineering in Medicine and Biology Society. Jul. 18-21, 2018 Design of a Microbiota Sampling Capsule using 3D-Printed Bistable Mechanism | IEEE Conference Publication | IEEE Xplore.

* cited by examiner

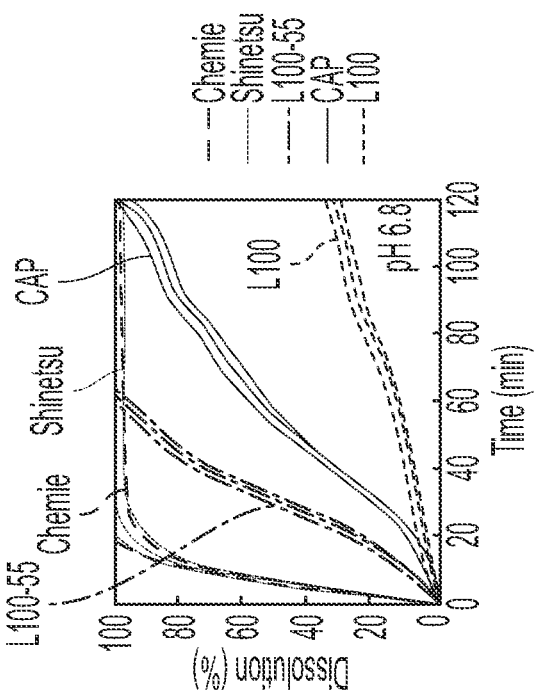
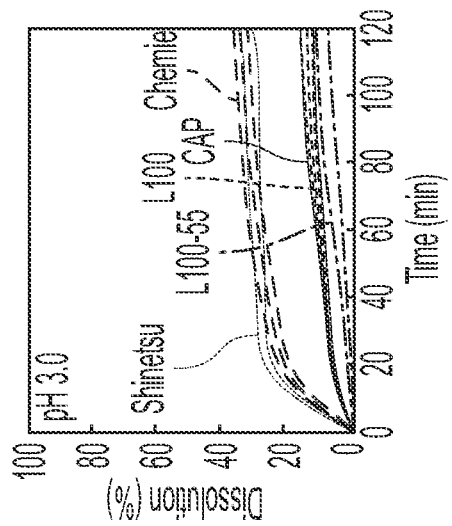
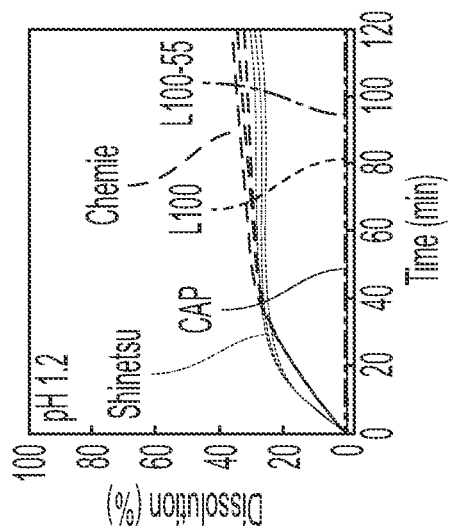
FIG. 18A
FIG. 18B
FIG. 18C

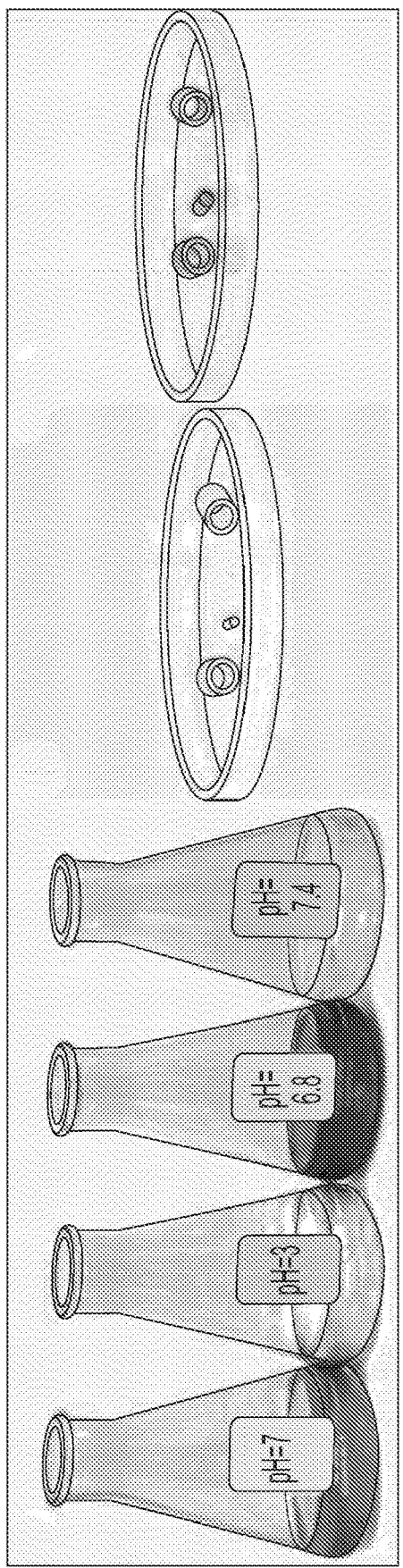
FIG. 22A
FIG. 22B
FIG. 22C
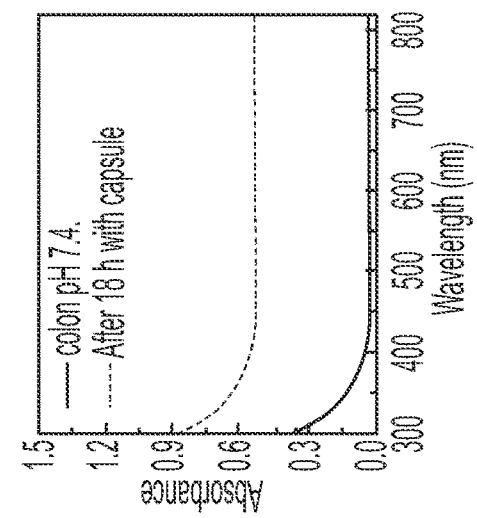
FIG. 22F
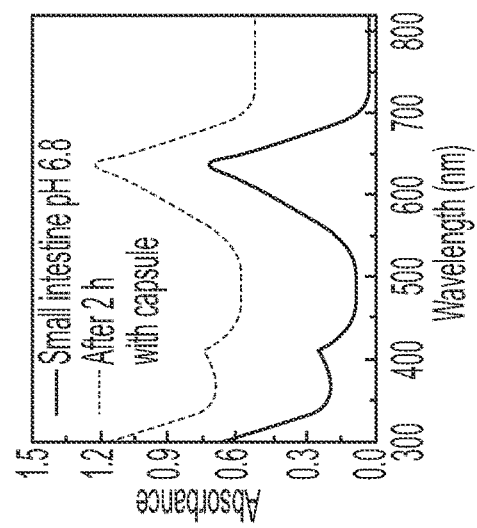
FIG. 22E
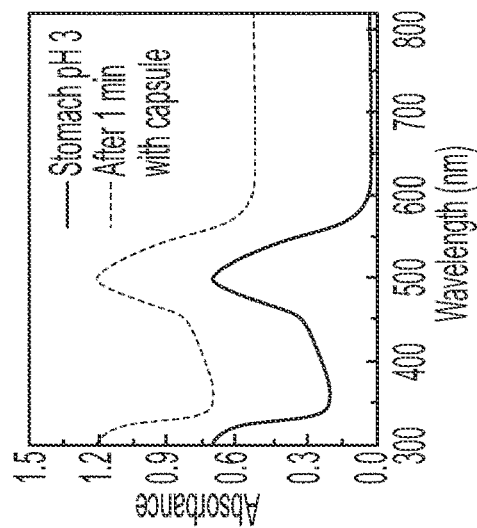
FIG. 22D

CAPSULE FOR GASTROINTESTINAL SAMPLING

FIELD

Disclosed embodiments are related to capsules for non-invasive gastrointestinal sampling.

BACKGROUND

Numerous studies have found that the gut microbiota plays an important role in the pathophysiology which dominates human health. Many of these studies have identified the effects of the gut microbiota on human metabolism, nutrition uptake, efficacy of orally-administered therapeutics, and functionality of immune and neural systems. For example, a number of studies have found correlations between microbiota imbalance (dysbiosis) and various diseases including diabetes, obesity, and metabolic syndrome; diseases which affect approximately 30 million people in the US. Similarly, recent insights regarding possible ways that gut bacteria may influence development and maintenance of the nervous system suggest a link between gut microbiome composition and the regulation of psychoneurological disorders including anxiety, depression, and dysbiosis in autism.

SUMMARY

In one embodiment, a device for passive sampling of the gastrointestinal tract, comprises a capsule housing bounding a cavity, a sampling aperture formed in the capsule housing and providing fluid communication between the cavity and an exterior of the capsule housing, and a sampling hydrogel positioned inside the cavity. Upon exposure to a sample fluid, the sampling hydrogel is configured to absorb the sample fluid, expand within the cavity, and store the sample fluid for subsequent analysis. The device further comprises a sealing member positioned within the cavity between the sampling hydrogel and the sampling aperture. Expansion of the sampling hydrogel within the cavity presses the sealing member into engagement with the sampling aperture to seal the cavity.

In another embodiment, a method for passive sampling of the gastrointestinal tract of a patient comprises administering to a patient an ingestible device. The ingestible device comprises a capsule housing bounding a cavity, a sampling aperture formed in the capsule housing and providing fluid communication between the cavity and an exterior of the capsule housing, a sampling hydrogel positioned inside the cavity, and a sealing member positioned within the cavity between the sampling hydrogel and the sampling aperture. The method also comprises exposing the sampling hydrogel to a sample fluid within the patient's gastrointestinal tract, absorbing the sample fluid into the sampling hydrogel, expanding the sampling hydrogel within the cavity via absorption of the sample fluid, and sealing the cavity by pressing the sealing member into engagement with the sampling aperture via expansion of the sampling hydrogel. The method further comprises retrieving the device after the device passes through the patient's gastrointestinal tract, and retrieving the sample fluid from the sampling hydrogel after retrieving the device.

In another embodiment, a device for passive sampling of the gastrointestinal tract comprises a capsule housing bounding a cavity and a sampling aperture formed in the capsule housing and providing fluid communication between the cavity and an exterior of the capsule housing. A solution casted enteric coating covers the sampling aperture and degradation of the enteric coating exposes the sampling aperture to permit flow into the cavity.

In another embodiment, a method of manufacturing a device for passive sampling of the gastrointestinal tract comprises providing a capsule housing having a cavity and a sampling aperture, the sampling aperture providing fluid communication between the cavity and an exterior of the capsule housing. The method further comprises forming an enteric coating over the sampling aperture using a solution casting technique to cover the sampling aperture.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 18A is a plot showing the dye release of different enteric coating polymers in pH 1.2 buffer solution;

FIG. 18B is a plot showing the dye release of the enteric coating polymers in pH 3.0 buffer solution;

FIG. 18C is a plot showing the dye release of the enteric coating polymers in pH 6.8 buffer solution;

FIG. 22A is a photograph of four flasks containing various pH buffer solutions simulating pH changes along the GI tract using different colored dyes, from left to right: saliva pH 7, stomach pH 3, small intestines pH 6.8, and colon pH 7.4 (DI water).

FIG. 22B is a photograph of a retrieved and opened capsule after 2 hours in the stomach (pH 3 buffer solution);

FIG. 22C is a photograph of a retrieved and opened capsule after 2 hours in the small intestine (pH 6.8 buffer solution);

FIG. 22D is a plot of UV-Vis absorbance of pH 3 media before and after the capsules were retained;

FIG. 22E is a plot of UV-Vis absorbance of pH 6.8 media before and after the capsules were retained;

FIG. 22F is a plot of UV-Vis absorbance of DI water media before and after the capsules were retained;

DETAILED DESCRIPTION

Figure 1:
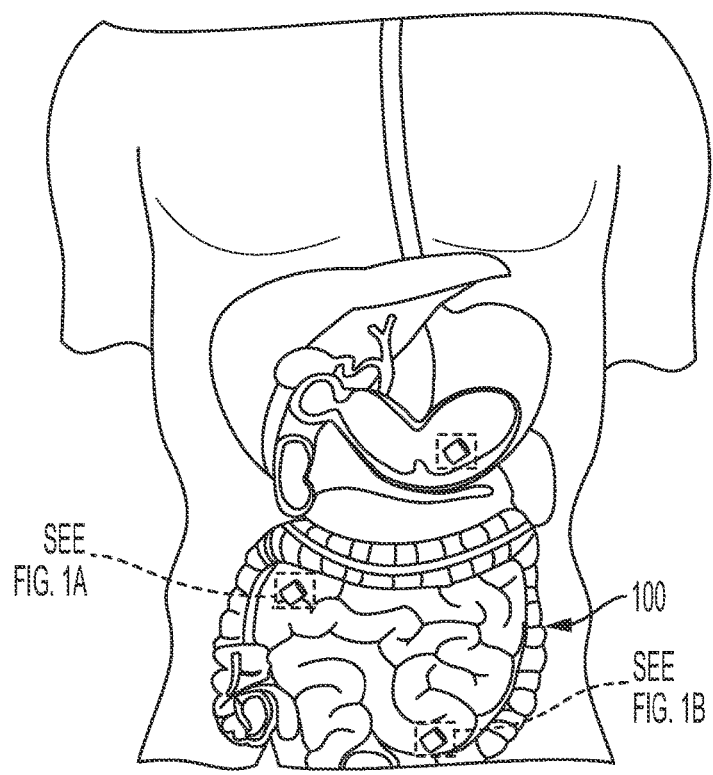
FIG. 1 is a schematic illustration showing a capsule traveling through a GI tract, according to some embodiments.

Human microbiome sampling is becoming an essential aspect of understanding the mechanisms of microbiota—drug interactions as well as the degree to which this complex interplay can affect the drug efficacy and bioavailability. Much of what is known regarding the structure and function of the human gut microbiome has been ascertained from ex-situ culturing and/or sequencing of bacteria from fecal samples. However, only a small fraction of gut bacteria is available and culturable from fecal samples, and thus efforts have been made to develop tools that will enable direct sampling of microorganisms from the gastro-intestinal (GI) tract. For example, colonoscopy and/or gastroscopy methods are currently used, but these methods are limited to sampling at certain sections throughout the GI tract, and are invasive approaches which cause patient discomfort and can lead to decreased compliance. Other approaches have used smart functional capsules with the ability to collect samples at different targeted locations in the GI tract, and these methods can address several limitations associated with conventional colonoscopy and gastroscopy. Furthermore, capsule-based devices can improve patient comfort, without the requirement of being administered in clinical settings. For instance, the PillCam™ capsule endoscopy (CE) technology is used for collecting images from hard-to-reach areas throughout the GI tract to diagnose diseases related to the small intestine, such as obscure GI bleeding, tumors, Crohn's disease, angiodysplasia, celiac disease, and polyposis. However, this technology lacks the ability to collect and store samples as it travels through the GI tract.

Efforts in developing new capsules with different methods for sampling the gut microbiome can be classified into two main categories: active and passive devices. In active devices, an actuation and sampling mechanism are often attained by using an on-board battery that provides the required energy to actuate various plungers, pistons, biopsy forceps, etc., which collect and store samples within the capsule. However, in such devices, the battery often occupies a large fraction of the capsule volume, which may limit the space in which samples can be stored, and active devices typically exhibit a high risk of failure and possibility of leakage of caustic electrolytes that can cause severe corrosive injury and liquefactive necrosis. To avoid these and other drawbacks associated with active devices, various passive actuation sampling mechanism approaches have been exploited, thereby enabling the capsules to be more compact, economically viable, with fewer safety-associated issues. In such designs, the capsule moves through the GI tract via peristalsis motion with an average speed of 1-2 cm/min and the samples are collected through simple passive actuations such as capillary wicking actions or pressure differentials forces. However, the inventors have recognized and appreciated that there are numerous important design considerations that have not been addressed by existing passive devices. For example, some existing approaches rely on capsule assemblies requiring a well-sealed vacuum chamber inside a capsule, which significantly increases the complexity of the device. Other approaches have relied on retrieval of a sampling device via a string extending upstream from the GI tract, which can cause discomfort for a patient. Moreover, most existing passive sampling devices lack the ability to seal and protect the collected samples after the sampling at targeted location is completed, and thus such devices are unable to provide localized samples from specified portions of the GI tract.

In view of the above, the inventors have recognized and appreciated numerous advantages associated with passive sampling GI devices that provide for simple construction and allow for sealing of the capsule once a sample is collected from a desired portion of the GI tract. For example, in some embodiments, a passive sampling device may comprise a capsule that may be ingested by a patient such that the capsule travels through the GI tract. The capsule may include a capsule housing defining a cavity and an absorbent sampling hydrogel positioned within the cavity. The capsule housing may include a sampling aperture that permits fluid from the GI tract (e.g., fluid containing microorganisms or proteins such as calprotectin) to flow into the cavity, where it is absorbed by the sampling hydrogel. Upon absorbing the fluid, the sampling hydrogel may expand within the cavity and press a sealing member (e.g., a sealing membrane) positioned in the cavity between the aperture and the hydrogel material into engagement with the aperture to seal the aperture, thereby restricting subsequent fluid flow into or out of the capsule. In this manner, the devices disclosed herein may utilize the sampling hydrogel as a medium to store microbial samples within a capsule and also as a means for providing passive mechanical actuation to seal the capsule once sampling is completed. Additionally, the inventors have appreciated that after the capsule is sealed, the hydrated sampling hydrogel within the capsule may provide an ideal living environment with nutrients for the sampled bacteria to survive before retrieval of the capsule. Moreover, according to some aspects, the sealing of the capsule may aid in protecting collected samples within the capsule from harsh environments located within the GI tract, thereby preserving the bacterial samples stored in the sampling hydrogel samples for subsequent analysis.

In some embodiments, a capsule may include a biodegradable coating on at least a portion of the capsule housing. For example, the biodegradable coating may be an enteric coating that is configured to dissolve at a desired target location along the length of the GI tract. In one embodiment, the biodegradable coating is provided over a portion of the capsule housing in which an aperture is formed. Accordingly, the biodegradable coating may seal the aperture until the capsule reaches the target location, and subsequently degrade to allow gut fluids to enter into the capsule cavity through the aperture. It should be understood that a capsule according to the current disclosure may include any suitable biodegradable enteric coating, as would be appreciated by one of skill in the art. For example, suitable coating materials include, but are not limited to, pH-sensitive polymeric materials such as poly methacrylic acid-co-ethyl acrylate (EDURAGIT L 100-55), poly methacrylic acid-co-methyl methacrylate (EUDRAGIT L100), hydroxypropyl methylcellulose phthalate (HP-55), hypromellose phthalate (HPMCP), cellulose acetate phthalate (CAP), and polyvinyl acetate phthalate (PVAP).

In some embodiments, the enteric coating is formed using a solution casting technique. In such a technique, a polymer is dissolved in a solution and the solution is coated onto a sampling aperture on the cap. In some embodiments, the cap of the sampling capsules is placed on a silicone (e.g., PDMS) holder that blocks the aperture of the cap while the enteric coating is deposited onto the cap to prevent the enteric coating from passing through the aperture. The solution may have a high viscosity and may dry quickly. After the coating dries, the cap may be lifted off of the holder. The solution may separate easily from the silicone holder, thus allowing the coating to remain with the cap and cover the aperture of the cap. In some embodiments, the coating can be formed by drop casting which involves releasing large droplets with controlled sizes and momentum that spread and wet the surface upon impact. In some embodiments, a doctor blade may be used to create a film with a uniform thickness. Doctor blading, also known as knife coating or blade coating, involves running a blade over a surface (or moving the surface underneath the blade). A small gap between the blade and the substrate determines how much solution can get through as the blade passes, spreading the solution uniformly over the substrate. In both drop casting and doctor blade processes, the enteric coating covers the sampling aperture on the capsule cap which provides targeted dissolution throughout the GI tract to enable target activation and sampling.

As noted above, a capsule may include a sealing member that may be pressed into engagement with a sampling aperture of the capsule by the sampling hydrogel after the sampling hydrogel absorbs a gut fluid sample and expands within the cavity of the capsule. According to some aspects, the sealing member may be configured to provide a desired gas permeability between the cavity of a capsule and an exterior environment. For example, in some embodiments, the sealing member may be formed as a polydimethylsiloxane (PDMS) membrane, which may provide gas permeability to allow a natural gas exchange between the GI tract and the interior of the capsule (i.e., the cavity), which may aid in maintaining the natural metabolism of sampled bacteria and promote their survival after the capsule is sealed. Other suitable materials for the sealing member include, but are not limited to, polyvinyl chloride (PVC), thermoplastic polyurethanes (TPU), cylic olefin copolymer (COC), and perfluoropolyether (PFPE).

Depending on the particular embodiment, the capsules described herein may be able to maintain live bacteria viable for subsequent analysis for an extended period of time after the capsule is sealed via the sealing member. For example, in some embodiments, the sampling hydrogel and/or sealing member maybe constructed and arranged to maintain live bacteria in a sample fluid viable (i.e., keep the live bacteria alive) for at least 1 hour, at least 5 hours, at least 10 hour, at least 20 hours, or at least up to 24 hours or more before the sampling fluid is retrieved for analysis.

In some embodiments, the device may be used to collect proteins or other biomarkers to investigate a condition in the body. For example, in some embodiments, the device may be used to collect calprotectin in the GI tract to diagnose inflammatory bowel disease (IBD). Calprotectin is a protein released by neutrophils when there is inflammation in the GI tract.

After passing through the GI tract, the sealed capsule may be excreted by a patient and subsequently recovered to analyze the gut microbiome samples contained therein. According to some aspects, the capsule may be constructed and arranged to permit facile disassembly once recovered, thereby permitting easy recovery of the sampling hydrogel containing the samples. For example, in some embodiments, the capsule housing may be formed from two or more housing portions that may be removably secured to one another to permit access to the cavity of the capsule. In one exemplary embodiment, a capsule housing may be formed from two capsule portions that attach to one another via a threaded interface, which may allow the capsule to be easily disassembled after being retrieved through excretion such that the sampling hydrogel within the capsule may be removed for future culture and analysis of bacterial samples contained therein. Other suitable interfaces include, but are not limited to a snap fit interface, and a friction or interference fit interface.

According to some aspects, prior to assembly of the various components of a capsule housing, the components may be treated to provide a hydrophilic coating on the capsule housing. The inventors have recognized and appreciated that such treatments may aid in facilitating the flow of sample fluid through a sampling aperture and into the interior of the cavity where the sampling fluid may be absorbed by the hydrogel material contained therein. In particular, a hydrophilic coating on the surface of the capsule housing may aid in providing a continuous pull of fluid from the gut into the narrow sampling aperture on the capsule. For example, in some embodiments, a hydrophilic surface modification may be performed by activating the surfaces of the housing components using an air plasma treatment followed a polyethylene glycol (PEG) treatment, as described in more detail below.

The hydrogel materials disclosed herein may be composed of hydrophilic polymer networks capable of absorbing large quantities of water while maintaining their structure. These polymer networks are typically crosslinked via covalent bonds, hydrogen bonds, van der Waals interactions, and/or physical entanglements. The devices disclosed herein take advantage of both the absorption capacity, as well as the mechanical properties of hydrogels to provide non-invasive sampling devices which can passively extract and secure samples from targeted locations along the GI tract.

In some embodiments, the sampling hydrogel within a capsule may be synthesized from a combination of acrylic acid (AA) and acrylamide (AM) monomers. It should be understood that the current disclosure is not limited to any particular ratio of these monomers to form a hydrogel material. For example, suitable ratios of these monomers may include, but are not limited to 10% AA/90% AM, 30% AA/70% AM, 50% AA/50% AM, 70% AA/30% AM, or 90% AA/10% AM. As discussed in more detail below, a hydrogel material may be formed by mixing these monomers with deionized (DI) water as well as methylene bisacrylamide (MBA) as a cross-linker and ammonium persulfate (AP) as an initiator. While certain hydrogel materials are described herein, it should be understood that other hydrogel materials may be suitable, such as hydrogels based on other acrylic polymers (e.g., combinations of acrylic acid, acrylamide, poly(N-isopropylacrylamide), and/or poly(N,N-diethylacrylamide)) and/or non-acrylic polymers. In some embodiments, hydrogels may be synthesized from a combination of acrylamide and N,N'-methylenebisacrylamide (MBA).

It should be appreciated that a capsule housing according to the current disclosure may be made from any suitable biocompatible material. For example, in some embodiments, the capsule housing may be formed from a biocompatible polymeric material, such as a methacrylate polymer. Other suitable materials include, but are not limited to, commercially available biocompatible polymers such as Dental LT Clear, MED625FLX, and MED610, and/or other polymeric materials treated with PEG to provide biocompatibility. Moreover, it should be understood that the current disclosure is not limited to any particular method to form the capsule housing. For example, some embodiments described in more detail below utilize capsule housings formed by a 3D printing process. Other suitable manufacturing methods may include, but are not limited to casting methods, molding methods (e.g., injection molding), or other methods as would be appreciated by one of ordinary skill in the art.

Depending on the particular embodiment a capsule may have any suitable dimensions. For example, a cylindrical capsule may have a length of between about 9 mm and about 23 mm and a diameter between about 4.5 mm and about 10 mm. For example, in one embodiment, a capsule may have a diameter of about 9 mm and a length of about 15 mm, which is smaller than a standard 000 size gelatin capsule (which has dimensions of 9.97×26.14 mm). Moreover, a sampling aperture formed in the capsule housing may have a diameter selected based on a size of a sealing member contained within the capsule. For example, in some embodiments, the diameter of the sampling aperture may be selected to be at least 1 mm smaller than a diameter of the sealing member, which may aid in ensuring proper sealing of the capsule with the sealing member. In one exemplary embodiment, the sampling aperture may have a diameter of about 5 mm.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1A:
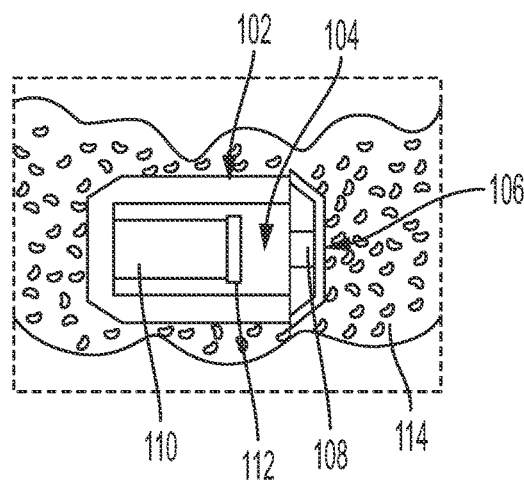
FIG. 1A is an enlarged view of a FIG. 1 showing the capsule at a first location in the GI tract.
Figure 1B:
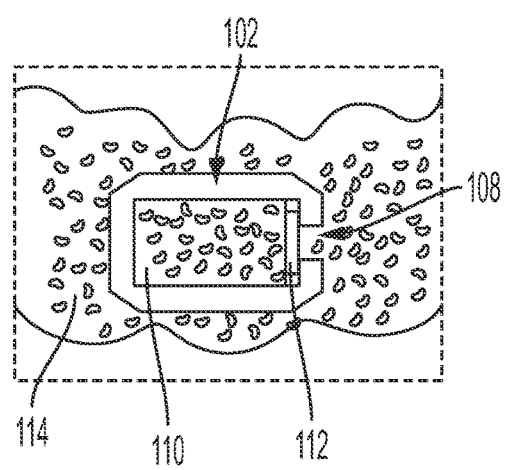
FIG. 1B is another enlarged view of FIG. 1 showing the capsule at a second location in the GI tract.

FIG. 1 is a schematic illustration of a sampling capsule 102 within a GI tract 100. As shown in FIG. 1A, the capsule 102 includes a biodegradable coating 106 (e.g., an enteric coating) that seals a sampling aperture 108 of the capsule. In this manner, the biodegradable coating protects the components within a cavity 104 of the capsule, including a sampling hydrogel 110 and a sealing member 112, and delays sampling until the capsule reaches a target location within the GI tract. In the depicted embodiment, the biodegradable coating covers only a portion of the capsule 102 so as to cover the sampling aperture 108. However, it should be appreciated that other arrangements may be suitable, such as arrangements in which the biodegradable coating initially surrounds more or less of the capsule 102, or the entire exterior of the capsule 102. As illustrated in FIG. 1B, once the capsule 102 reaches the target location, the coating 106 degrades and allows GI fluids, which contain bacteria 114, to enter the capsule, where the fluids are absorbed by the sampling hydrogel 110. Upon absorbing the fluid, the sampling hydrogel swells and expands within the cavity 104 and fills substantially the entire volume of the cavity. Additionally, the expansion of the sampling hydrogel presses the sealing member 112 into contact with the sampling aperture, thereby sealing the sampling aperture via the mechanical force applied by the swollen hydrogel. As illustrated, the fluid absorbed by the sampling hydrogel may contain bacteria 114 from within the GI tract. After the capsule is excreted, the capsule may be disassembled to allow retrieval of the sampling hydrogel and the bacteria samples contained therein such that bacteria may be subject to future culture and analysis.

For example, when a patient swallows a sampling device with a biodegradable polymer enteric coating, the device may be exposed to the saliva at pH 7 for less than 1 minute. As the device moves towards the stomach, the pH drops to roughly 3. The device may remain inactivated as the polymer remains un-ionized in the acidic pH environment of the stomach. As the device moves further down the gastrointestinal tract, the pH increases when it reaches the small intestine with an average pH of 6.8 and maximum pH of 7.5. As the pH exceeds the dissolution threshold of the enteric coating, the polymer starts to ionize, initiating the polymer dissolution. Once dissolved, intestinal fluid may enter the cavity 104 and the hydrogel may start to swell by absorbing the intestinal fluid while pushing a sealing member inside the cavity towards the sampling aperture. The pH is then reduced when the capsule approaches the ileocecal valve and slightly increases as it continues traveling through the colon. With the device aperture sealed with the sealing member, the device can move along in the colon with no fluid exchange.

It may take approximately four to six hours for the device to travel through the small intestine. Depending on the intended application of the device, enteric coating dissolution and/or hydrogel elongation may be tuned to a desired target location in the small intestines. For example, in some embodiments, the enteric coating may be configured for total dissolution in one hour after entry of the device into the small intestines, then afterwards the hydrogel may be configured to elongate in one hour, and finally afterwards the device may be configured to be sealed by the sealing member in 0.4 hours. These time target time intervals may allow for a safety margin of more than 1.6 hours before the device reaches the colon. After excretion, the capsule can be retrieved, disassembled, and the sample can be analyzed for further investigations.

Figure 2A:
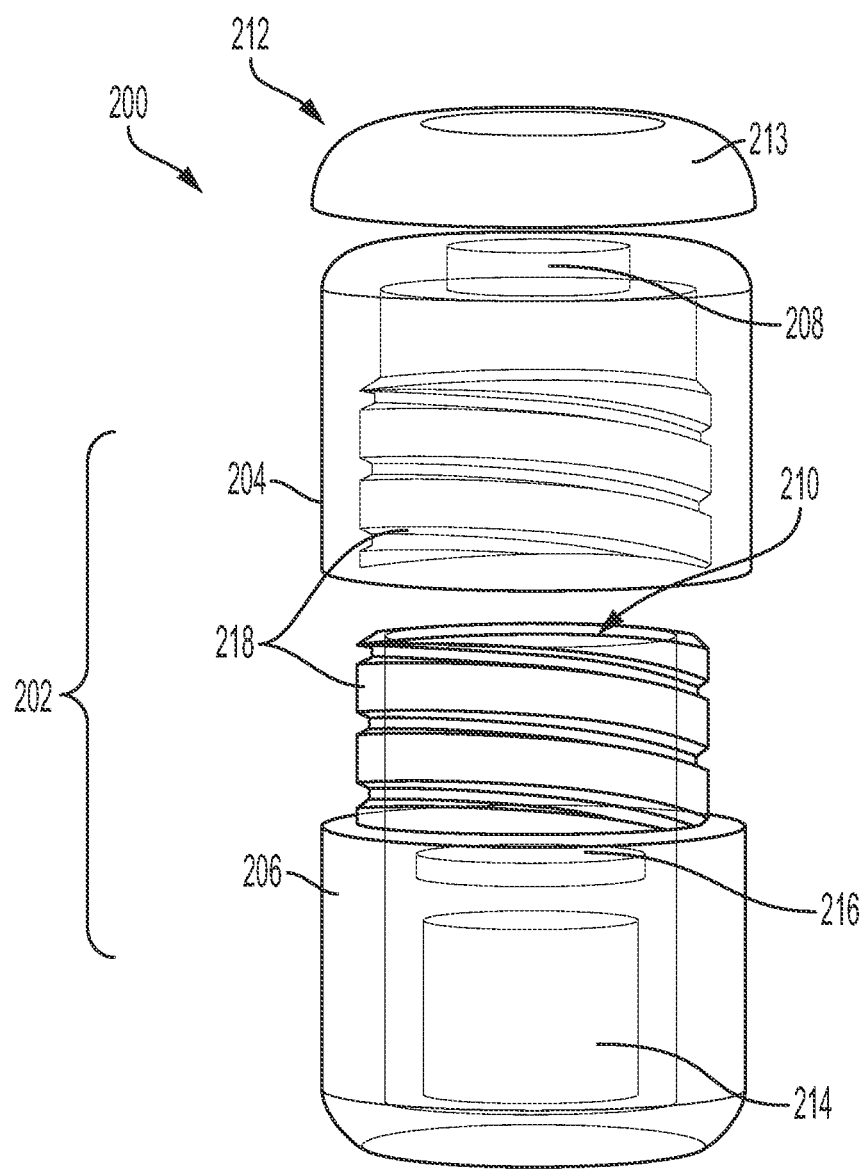
FIG. 2A is an exploded view of a capsule, according to some embodiments.
Figure 2B:
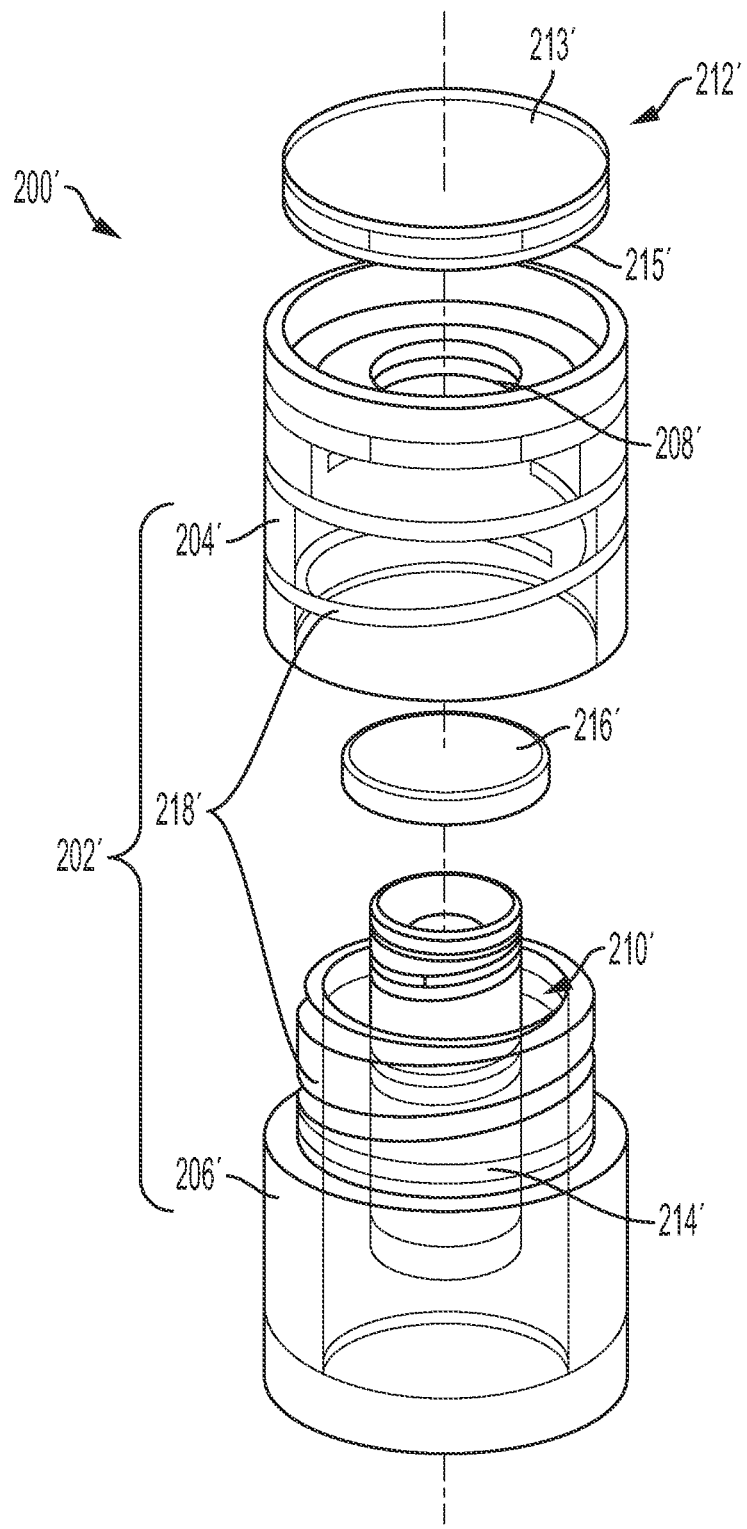
FIG. 2B is an exploded view of a capsule, according to some embodiments.

FIGS. 2A-B are schematic exploded views of two embodiments of a capsule 200, 200' for passive sampling of the gastrointestinal tract. The capsule 200, 200' includes a capsule housing 202, 202' including a first housing portion 204, 204' (also referred to herein as a cap) and a second housing portion 206, 206'. The first housing portion includes a sampling aperture 208, 208' to provide fluid communication between an exterior of the capsule and a cavity 210, 210' formed within the capsule housing 202, 202'. A biodegradable coating 212, 212' (e.g., an enteric coating as discussed above) is provided around at least a portion of the capsule housing to seal the sampling aperture 208, 208' until the capsule 200, 200' reaches a desired location within the GI tract. A sampling hydrogel 214, 21' and a sealing member 216, 216' are positioned within the cavity 210, 210', and as illustrated, the sealing member 216, 216' is positioned between the sampling hydrogel 214, 214' and the sampling aperture 208, 208'. As noted above, in some embodiments, the sealing member may be a flexible membrane such as a PDMS membrane, and may provide for gas permeability between the cavity 210, 210' and an exterior of the capsule 200, 200' after the sealing member seals the cavity. Additionally, the first and second housing portions 204, 204' and 206, 206' include an attachment interface 218, 218' to allow the capsule housing to be easily disassembled for retrieval of the hydrogel material after a sample has been collected. In the depicted embodiment, the attachment interface 218, 218' comprises corresponding threaded features formed on the first and second housing portions that cooperate to form a screw interface. However, as noted above, other attachment arrangements such as a snap fit or interference fit may be suitable in other embodiments.

The biodegradable coating may have different shapes. For example, the biodegradable coating may be circular, such as the circular coatings 212, 212' shown in FIGS. 2A, 2B, respectively. In other embodiments, the biodegradable coating may be square, rectangle, oval, or any other suitable shape. In some embodiments, the biodegradable coating may have a curved outer surface, such as the biodegradable coating 212 with a curved outer surface 213 shown in FIG. 2A. In some embodiments, the biodegradable coating may have a flat outer surface, such as the biodegradable coating 212' shown in FIG. 2B having a flat outer surface 213'. In some embodiments, the biodegradable coating may have a flat outer surface and a flat inner surface, such as the flat disc shown in FIG. 2B having a flat outer surface 213' and flat inner surface 215'. The biodegradable coating may be any shape that seals the sampling aperture 208, 208' of the capsule 200, 200'. In some embodiments, the biodegradable coating may extend across only a partial portion of the capsule housing 202, 202'. In some embodiments, the biodegradable coating may surround the entire exterior of the capsule housing.

EXAMPLES

Study I
Device Design and Assembly

Figure 3:
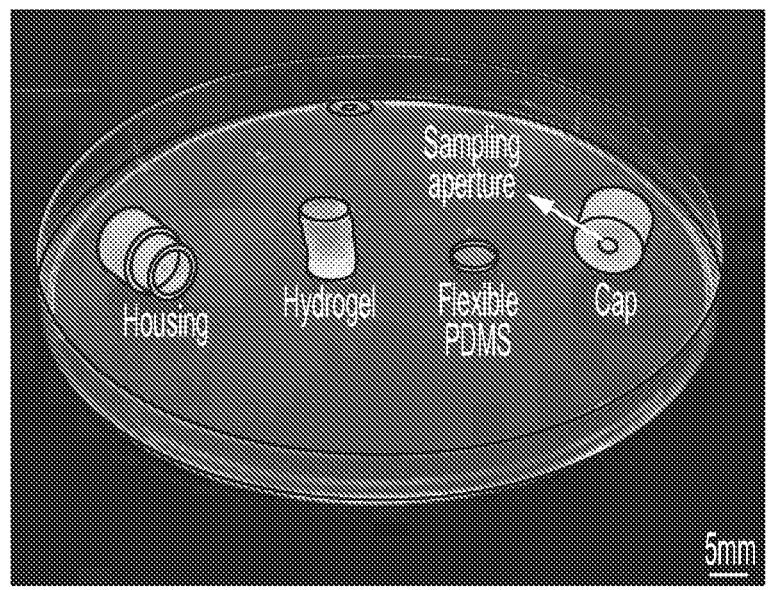
FIG. 3 is a photograph of the components of a capsule, according to one example.

In one example, a device for passive sampling of the gastrointestinal tract was manufactured using 3D printing. The device consisted of four components: a biodegradable enteric coating, a 3D-printed housing including a first housing portion and a cap, a sampling hydrogel, and a gas permeable PDMS membrane. The 3D-printed housing was designed with SolidWorks (Dassault Systèmes) and printed using a Form 2 3D printer via the PreForm software package (FormLabs) and with a biocompatible methacrylate photocurable polymer via stereolithography. The final outer diameter and length of the capsule were 9 mm and 15 mm, respectively. The inner diameter and the inner length were 7 mm and 14 mm, respectively. Each capsule was designed to contain the sampling hydrogel as well as the 1 mm thick PDMS membrane placed between the hydrogel and the sampling aperture formed in the cap. In particular, FIG. 3 shows a photograph of the various components prior to assembly. The sampling aperture (5 mm in diameter) on the capsule's cap was designed to allow easy flow of fluids into the capsule.

In this example, the highly absorbent hydrogel was synthesized with a mixture of deionized (DI) water, acrylic acid (AA) and acrylamide (AM) as monomers, methylene bis-acrylamide (MBA) as crosslinker, and ammonium persulfate (AP) as initiator. Crosslinked hydrogels were cut into cylindrical samples and fully dried before placing into the capsule. The PDMS membrane was made using a standard 1:10 ratio of curing agent to silicone base (Dow Corning) and cured at 80° C. for three hours, followed by laser cutting 6.5 mm in diameter circular membranes using a Class 4 $CO_2$ Laser (Universal Laser System).

Figure 4:
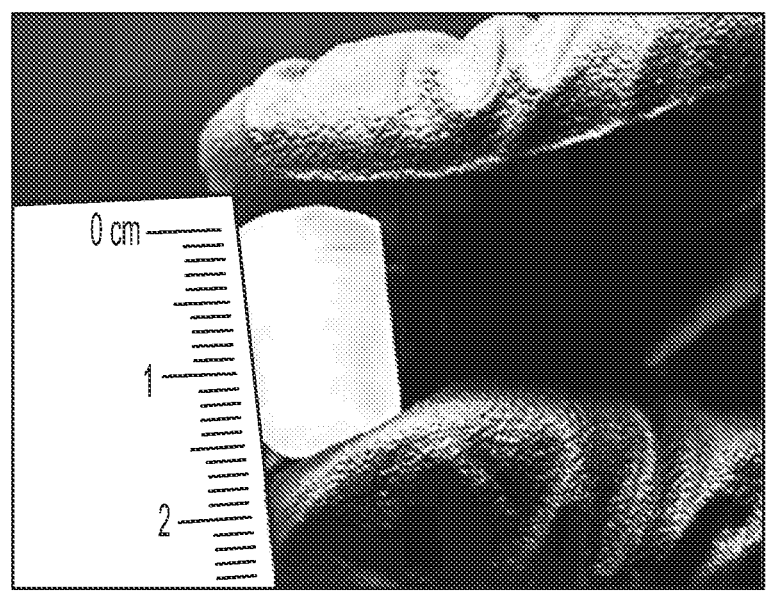
FIG. 4 is a photograph of components of FIG. 3 assembled into a capsule.

Prior to assembling of the device, a hydrophilic surface modification was performed onto the surface of the 3D-printed housing to ensure and facilitate the sampling fluid flowing through the capsule's aperture and entering into the cavity of the capsule. The surface modification was performed by using an air plasma treatment followed by a polyethylene glycol (PEG) treatment. The plasma treatment was achieved using a Tegal Corp Plasma Etcher at 480 mTorr for 2 minutes, followed by submersion in a solution of PEG for 18 hours. The housing was removed from the solution, rinsed thoroughly with DI water, and allowed to air dry for 24 hours. After both the housing and the hydrogel were fully dried, devices were assembled by placing the dried hydrogel on the lower half of the 3D-printed housing. The PDMS membrane was placed between the hydrogel and the device cap. FIG. 4 shows a photograph of the final assembled capsule with a diameter of 9 mm and length of 15 mm, which is smaller than a standard 000 size gelatin capsule (9.97 mm×26.14 mm).

Hydrogel Synthesis and Characterization

In one example, four ratios of AA to AM were used to determine which ratio resulted in the fastest absorption and highest compressive force: 10% AA/90% AM, 30% AA/70% AM, 50% AA/50% AM, 70% AA/30% AM, and 90% AA/10% AM. The total concentration of monomer mixture was 35 wt % of the total weight of the solution. DI water accounted for 60 wt % of the total weight, while MBA and AP accounted for 1 wt % and 4 wt % of the total weight, respectively. The different mixtures of AA/AM were mixed with DI water in 20 mL scintillation vials. MBA was fully dissolved by vortexing the solution for three minutes using a VWR Digital Vortex System. Once the MBA was fully dissolved, the solution was bubbled with nitrogen gas for thirty minutes in order to remove oxygen molecules which could inhibit polymerization, followed by addition of initiator. Solutions were left to polymerize at room temperature for three hours. After full polymerization, cylinders 5 mm in diameter and 12 mm in length were cut and dried in an isothermal oven overnight at 80° C. Once the hydrogels were fully dried, they were considered ready for testing.

Figure 5:
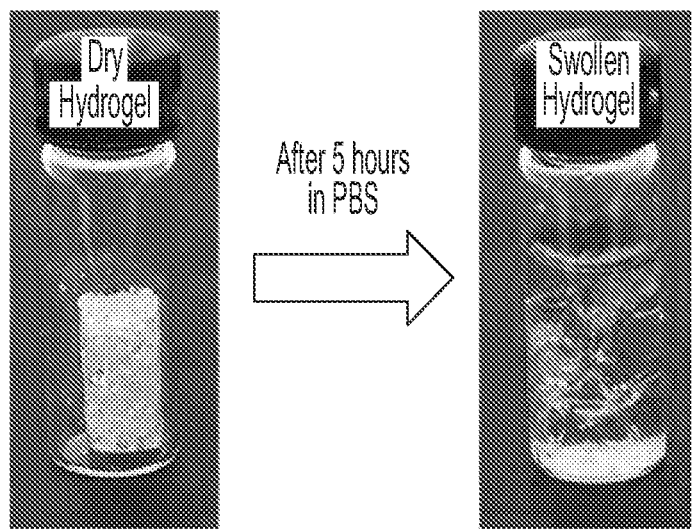
FIG. 5 shows photographs of a hydrogel swelling experiment, according to one example.
Figure 6:
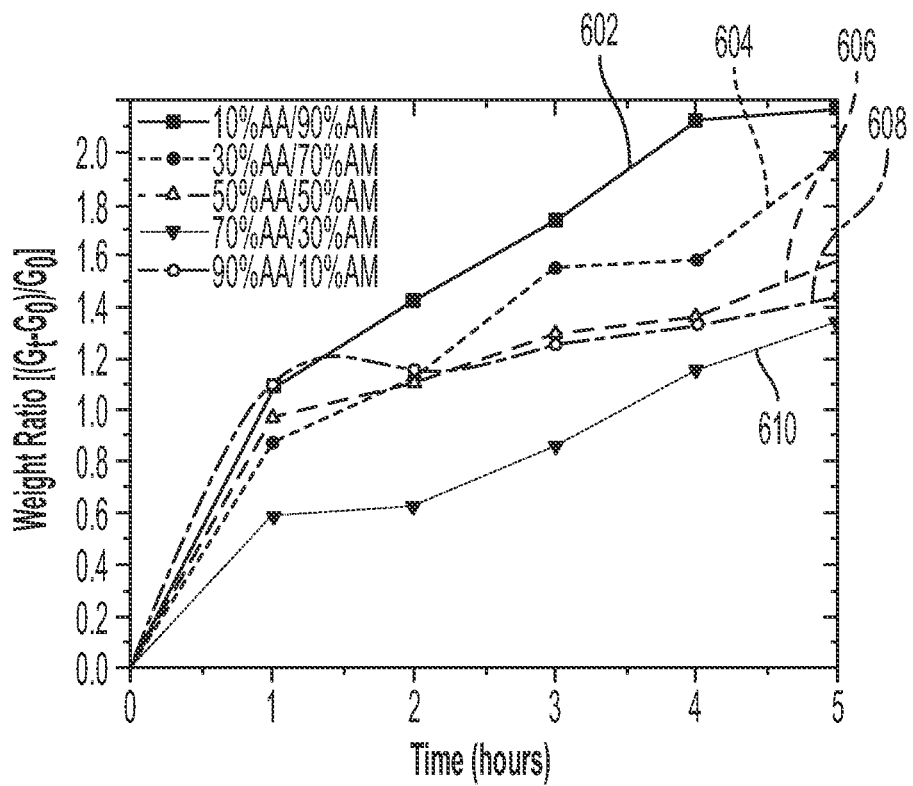
FIG. 6 is a plot showing the swelling ratio over time for hydrogels made with different AA/AM ratios, according to one example.

Next, the swelling capacity of the hydrogels with different AA/AM ratio was determined. For each AA/AM ratio, dried samples were weighed and submerged in a solution of 1:10 phosphate buffer solution (PBS), purchased from Sigma Aldrich, and DI water for five hours. Samples were removed from the solution and weighed every hour to determine the amount of water absorbed. The swelling response of hydrogels with different monomer ratios of 10% AA/90% AM, 30% AA/70% AM, 50% AA/50% AM, 70% AA/30% AM, and 90% AA/10% AM is shown in FIGS. 5-6. In particular, FIG. 5 shows photographs of a fully dried (left) and a fully swollen (right) hydrogel. The response is expressed in terms of weight ratios calculated by dividing the difference between the weight after submersion and the initial weight of the dry sample (Gt–G0) by the initial weight (G0). The general trend shown in FIG. 6 suggests that, with higher ratios of AA to AM, the swelling potential of hydrogels decreases. In particular, FIG. 6 shows plots for ratios of 10% AA/90% AM (602), 30% AA/70% AM (604), 50% AA/50% AM (606), 70% AA/30% AM (608), and 90% AA/10% AM (610). It was found that samples with a ratio of 10% AA/90% AM, had the fastest and largest swelling potential, reaching 2.2 times their initial dry weight within 5 hours. The only exception to this trend is found in samples with a ratio of 90% AA/10% AM. These samples initially show a rapid absorption, similar to the samples of 10% AA/90% AM ratio. However, despite their rapid initial response, the swelling ratio plateaus within the first hour.

In order to determine whether the hydrogels could exert enough force to overcome the GI pressure and seal the capsule efficiently, the compressive force of each hydrogel upon swelling was measured using an Admet Tensile Tester. Dry hydrogels were placed in 10 mL scintillation vials and fixed vertically on the stage of the tensiometer. A probe with a PDMS membrane used in the capsule was attached to a 10 N load cell and placed 1 mm away from the surface of each dehydrated hydrogel block. Vials were then filled with a 1:10 PBS/DI water solution and the compressive force generated by each sample was measured and recorded as the hydrogel swelled and pressed against the probe over time.

The normal baseline pressure within the lumen of the human colon is reported to be between 12 mmHg and 20 mmHg, which can also reach up to 26 mmHg (3466.38 $N/m^2$) after a meal in patients with constipation. Using force-pressure relations, the estimated extreme back force that can be exerted by the intraluminal pressure in the small intestine on the PDMS membrane inside the capsule is equal to 0.46N. Therefore, it was necessary for the PDMS membrane valve on the sampling capsule to withstand back forces greater than 0.46N for perfect sealing after sampling/activation.

Figure 7:
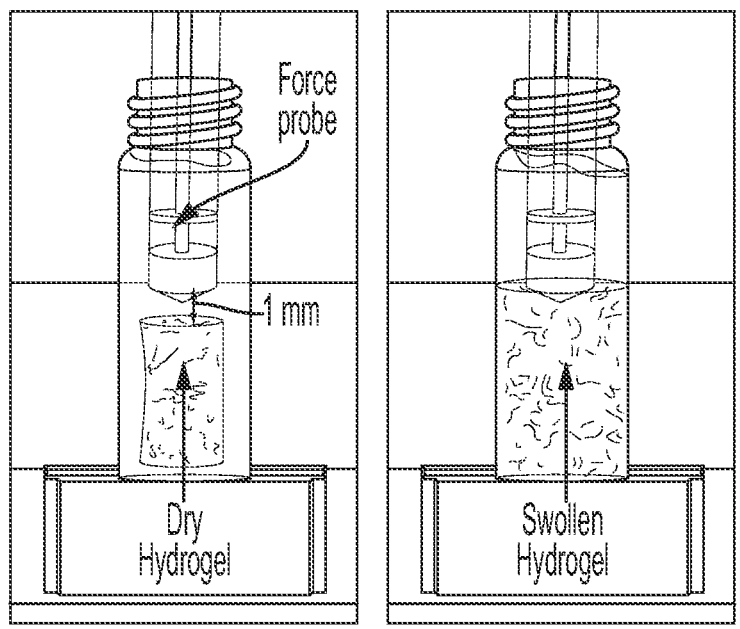
FIG. 7 shows photographs of a hydrogel expansion force experiment, according to one example.
Figure 8:
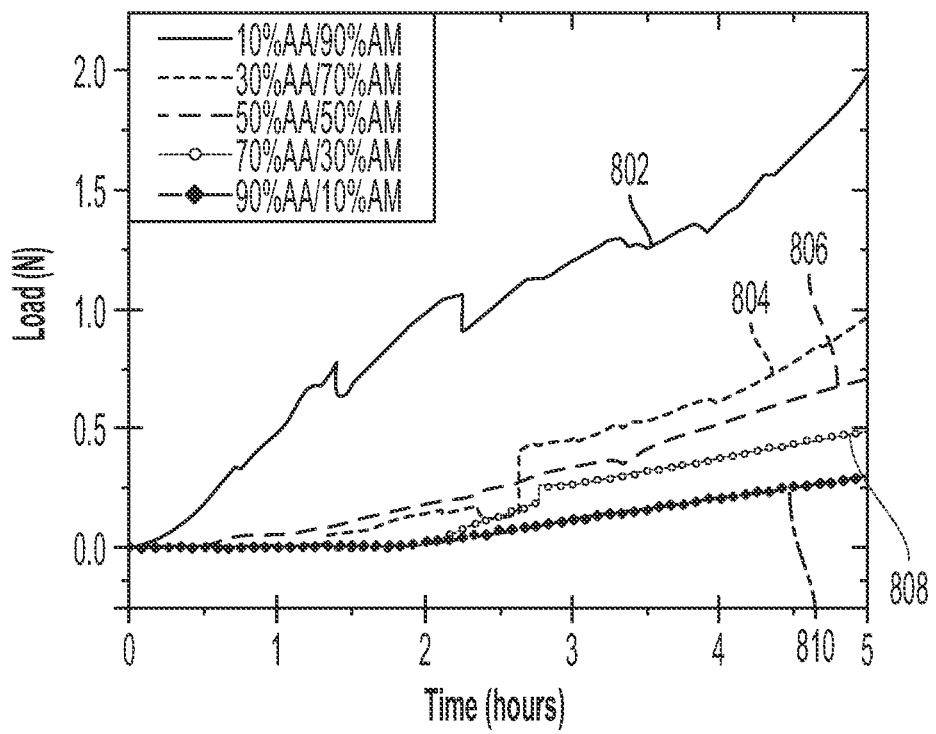
FIG. 8 is a plot showing force profiles generated during hydrogel swelling, according to one example.

FIG. 7 shows two photographs of dry and swollen hydrogels against the force probe, and FIG. 8 shows the force profiles that were recorded during the hydration process of hydrogel samples made with different AA/AM ratios as a function of time. In particular, FIG. 8 shows plots for ratios of 10% AA/90% AM (802), 30% AA/70% AM (804), 50% AA/50% AM (806), 70% AA/30% AM (808), and 90% AA/10% AM (810). These results show that the samples with a lower AA/AM ratio show a relatively faster increase in the force exerted on the PDMS membrane. Except for the hydrogel made with the 90% AA/10% AM monomer ratio, all other hydrogels were able to provide the necessary force during a five-hour hydration and swelling period that overcomes the estimated back pressure within the lumen of the GI tract (>0.46 N). Samples made of 10% AA/90% AM show the fastest increase, meeting the required force within an hour of hydration and swelling. The observed delay in force generated with different AA/AM ratios can be directly correlated to their corresponding swelling profiles. As seen in FIG. 7, dry hydrogels were placed 1 mm away from the force probe, as this was the total length the hydrogels would have to swell in order to seal the capsule. The faster absorption rate translates to faster detection of force generated as the hydrogel more readily reaches the probe. Given these results, crosslinked hydrogels with the monomer ratio of 10% AA/90% AM had the most suitable actuation and sampling capability, as it provided both the highest absorption and force generating properties and therefore was used in the final assembly of the sampling capsule and for further characterization.

Surface Wettability

In one example, in order to ensure a continuous pull of fluid from the gut into the narrow sampling aperture on the capsule, the capsule's polymeric surface was modified with a long-lasting hydrophilic coating, as discussed above. To assess the surface modification, surface contact angle measurements were taken using a Ramé-Hart Model 290 F1 Advanced Goniometer on untreated samples, plasma-treated samples, and plasma+PEG-treated samples. Initial as well as receding contact angle measurements were carried out at ambient temperature by placing a ~10 μL water droplet onto the 3D printed surface before and after the different surface modifications.

Figure 9:
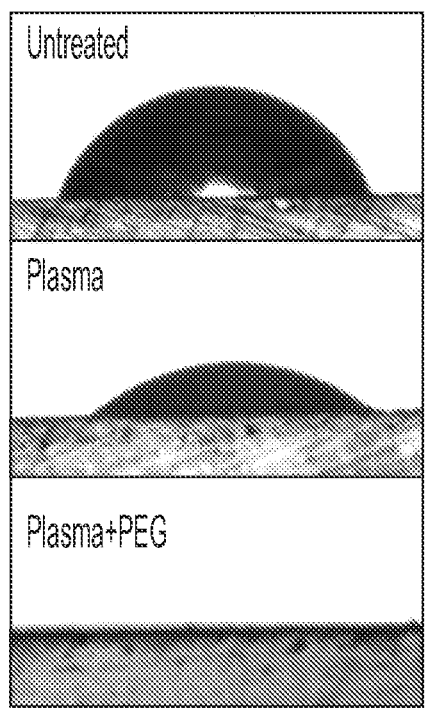
FIG. 9 shows photographs of a contact angle experiment, according to one example.
Figure 10:
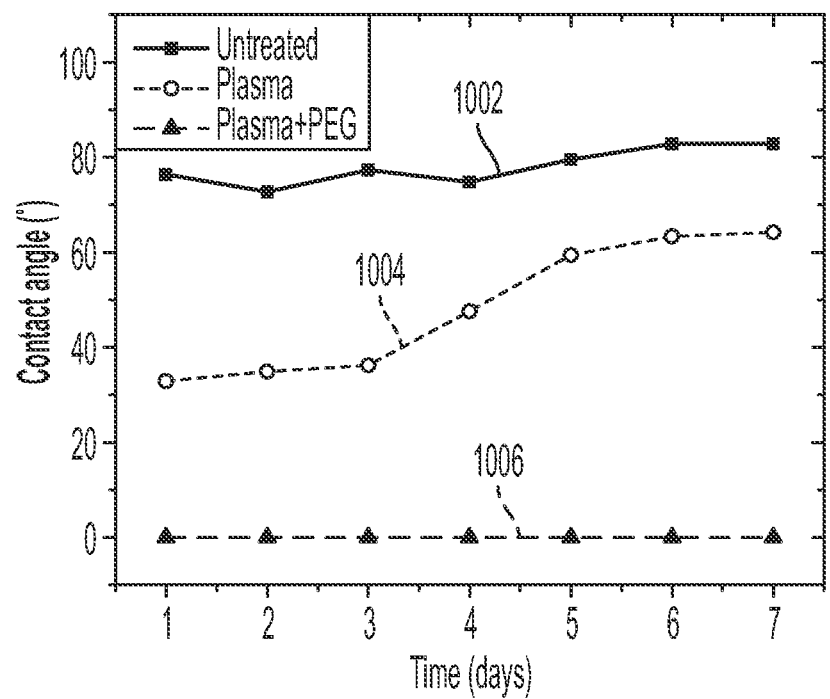
FIG. 10 is a plot showing contact angle over time for different surface treatments, according to one example.

FIGS. 9-10 shows the results of the contact angle measurements and its stability over time on the 3D-printed capsule casing before and after different surface modification procedures of only plasma treatment and plasma treatment followed by PEG coating. In particular, FIG. 9 shows photographs of water droplets on these various surfaces, and FIG. 10 shows a plot of the contact angle over time. Untreated 3D-printed surfaces exhibited a relativity high water contact angle with an angle of 80°, as shown in plot 1002. As shown in plot 1004, the results from the plasma treated samples shows a decrease in the water contact angle right after plasma activation from 80° to 33° which implies the generation of a hydrophilic surface. However, despite an initial increase in hydrophilicity, the results showed that the surface modification was unstable and the contact angle increased from 33° to 60° after five days. On the other hand, the plasma treatment followed by the PEG coating showed a super-hydrophilic surface characteristic with a contact angle of almost 0° during the entire seven-day period. as shown in plot 1006. The significant decrease in contact angle and its high stability over time demonstrates that the robustness of plasma+PEG surface modification treatment may aid in ensuring gut fluids will easily wick and flow through the sampling aperture.

Leak Tests

Figure 11:
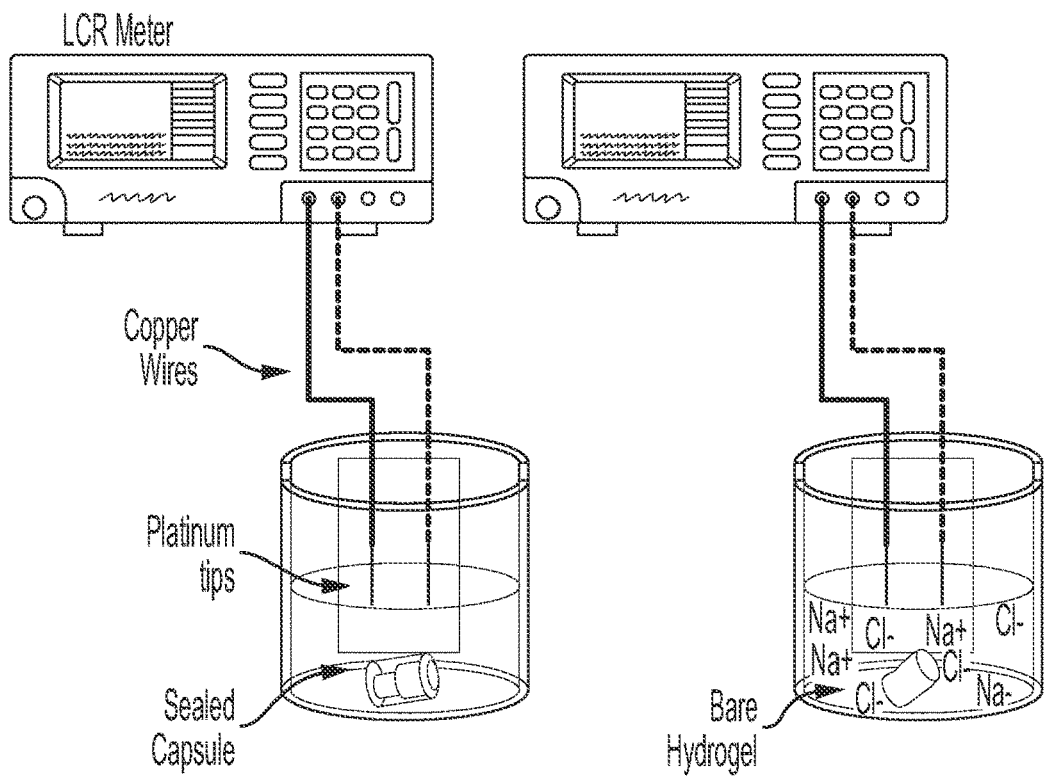
FIG. 11 is a schematic representation of a leak test, according to one example.
Figure 12:
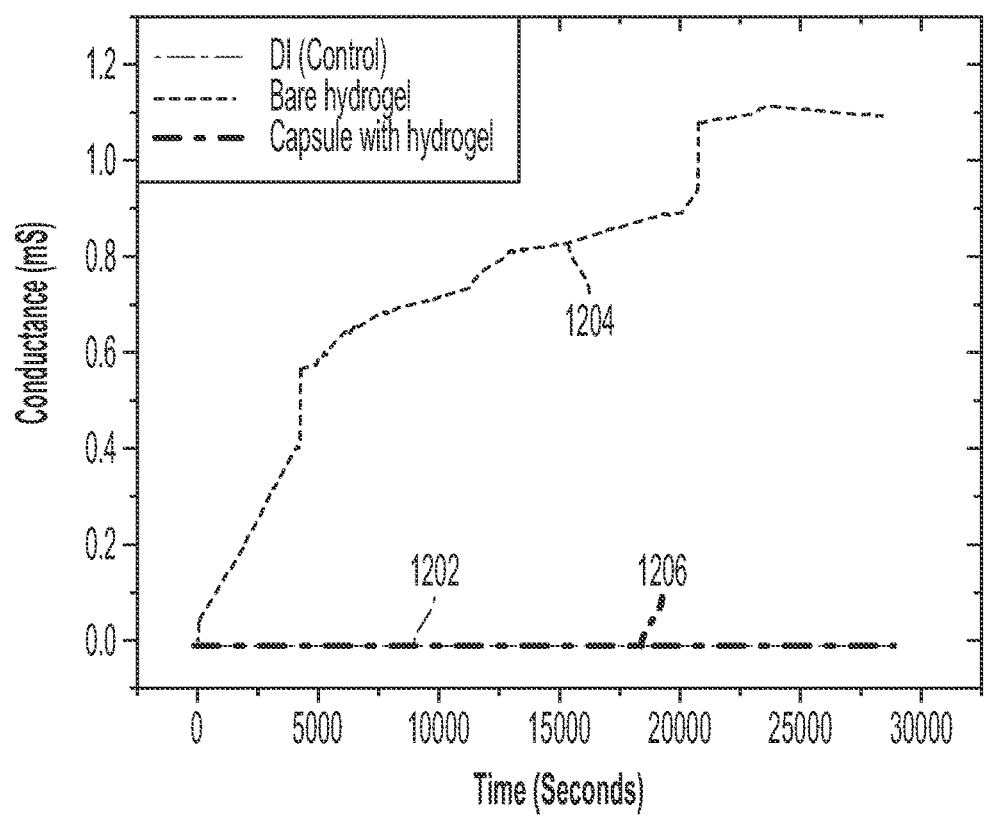
FIG. 12 is a plot showing a change in conductance over time in the leak test of FIG. 11.

In one example the sealing mechanism of the capsule was tested with two independent leak tests. The first test, which is illustrated schematically in FIG. 11, examined the electrical conductivity (EC) changes over time to detect possible leaks from the capsule after being activated and sealed with the swollen hydrogel. For this test, a fully assembled capsule and a bare hydrogel, were submerged in a 1 M solution of sodium chloride and DI water for 18 hours to ensure complete swelling of the hydrogels in both settings. They were then introduced into separate 20 mL solutions of fresh DI water and the change in electrical conductivity was measured for 8 hours using a Gw Instek LCR-821 meter. Given the low conductivity of DI water (0.05 μS/cm), any significant increase in conductivity was attributed to the exchange of fluids between the DI water and the salt-infused hydrogels. FIG. 12 shows a plot of changes in conductance for a solution of undisturbed DI water (1202), DI water after exposure to a bare hydrogel (1204), and DI water after exposure to a sealed capsule (1206). As illustrated, lines 1202 and 1206 overlie each other. The baseline conductance of DI water is close to 0.5 μS, due to the lack of ions in the solution. The conductance of the media, as the bare hydrogel is introduced, increases rapidly due to the quick exchange of fluids between the hydrogel and the environment. This scenario simulates a complete failure of the sealing mechanism, where free sodium and chloride ions are released into the fresh media, thus increasing the conductance of the system. The results for the hydrogel within the capsule indicate no increase in conductance over 8 hours, suggesting there is no leak from the capsule into the fresh media.

Figure 13:
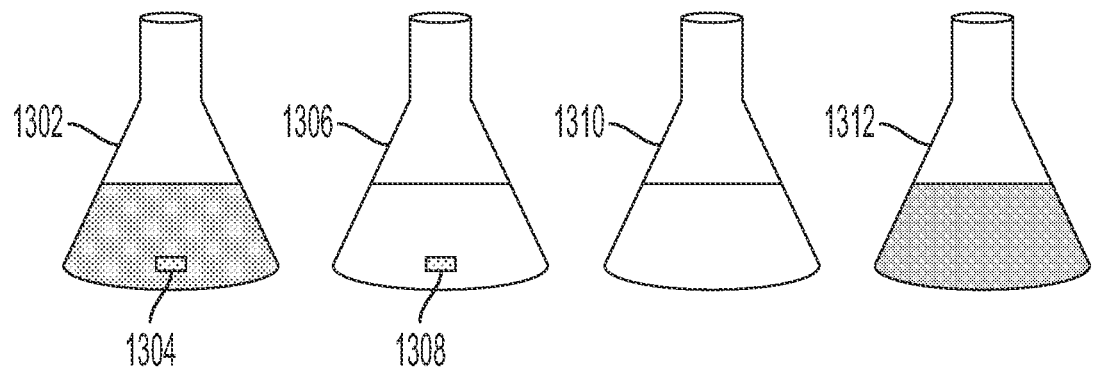
FIG. 13 is a schematic representation of an experimental setup of a leak test, according to another example.

In the second test a fully assembled capsule and a bare hydrogel, were placed into a solution of DI water containing red food coloring dye for 18 hours to ensure complete swelling and absorption of the food coloring dye into both hydrogels. They were then removed and placed into separate containers with DI water without opening the sealed capsule. The experimental setup for this test is shown schematically in FIG. 13: from left to right, flask 1302 contained a bare hydrogel 1304 in DI water, flask 1306 contained a sealed capsule 1308 in DI water, flask 1310 contained plain DI water, and flask 1312 contained DI water with red food coloring dye. The difference between the bare hydrogel and the sealed capsule becomes apparent when comparing the solutions in flasks 1302 and 1306. A slight visible change in color was observed in flask 1302 as the bare hydrogel released its contents into the solution. The solution containing the sealed capsule in flask 1306 was visually similar to plain DI water, as the sealing mechanism prevented any leakages.

Figure 14:
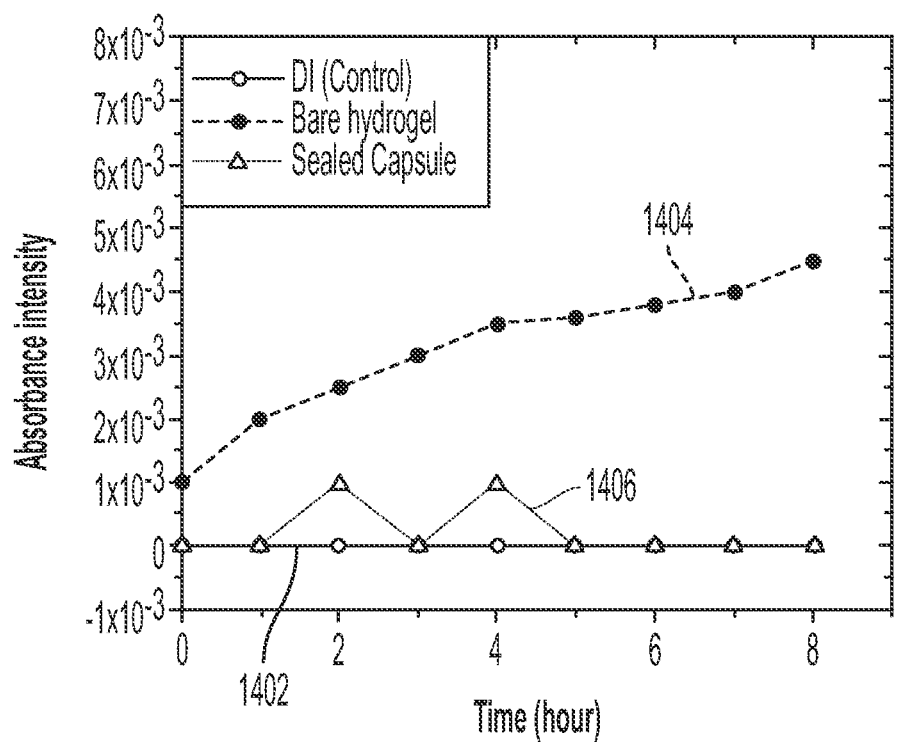
FIG. 14 is a plot of UV spectroscopy measurements from the leak test of FIG. 13.

Additionally, UV-Visible spectroscopy measurements were performed on 100 μL samples collected from both conditions every hour and their optical absorbance peaks at 510 nm were detected using a BioTek Epoch™ 2 microplate spectrophotometer. This test was used to assess and compare the leakage rate of the absorbed/sampled food color dye from bare swollen hydrogel and the activated and the sealed capsule. The results of this test, shown in FIG. 14, confirm that the sealing mechanism prevents any leakages within 8 hours. The absorption intensity of DI water with the bare hydrogel (plot 1404) increases over time as the food coloring is released into the environment. A dramatic increase after 5 hours confirms the presence of the dye. The absorption intensity of DI with a sealed capsule (plot 1406) and pure DI water (plot 1404) are comparable and remain stable over time, confirming no exchange of fluids between the hydrogel within the sealed capsule and the environment. The small peaks observed in the sealed capsule plot 1406 reflect noise due to the detection limit of the UV spectrometer used in this example.

Bacteria Sampling and Survival Assessment

Besides testing the effectiveness of the sealing mechanism, it was crucial to assess the hydrogel's ability to collect bacteria and determine whether culturing of retrieved bacteria is achievable. The most relevant applications of this device include its ability to access currently non-accessible regions of the GI tract to collect live bacterial samples for subsequent culturing. It is not only important to determine whether further fluid exchange will occur once ingested, but also to determine whether bacteria can survive once collected.

In one example, to determine bacteria sampling effectiveness and to understand the mechanism in which the hydrogel can collect microbes, cross section SEM images were taken from the hydrogel. In particular, the microstructure network of the produced hydrogel and its ability to capture bacteria within its porous matrix was evaluated using Hitachi S-4800 Field Emission Scanning Electron Microscopy (SEM) after Au/Pd sputtering. SEM imaging was performed on bare and bacteria-captured hydrogel samples. The first hydrogel sample was placed in a solution of PBS for 8 hours, while the second hydrogel was placed into a solution of 100% TSB inoculated with *E. coli*. Both hydrogel samples were freeze dried using a LyoStar 3 Freeze-dryer from SP Scientific for 18 hours prior to performing the SEM imaging.

Figure 15A:
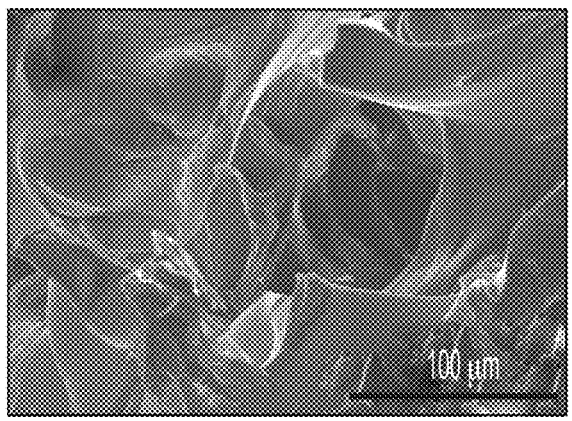
FIG. 15A is an SEM image of a hydrogel after exposure to DI water, according to one example.
Figure 15B:
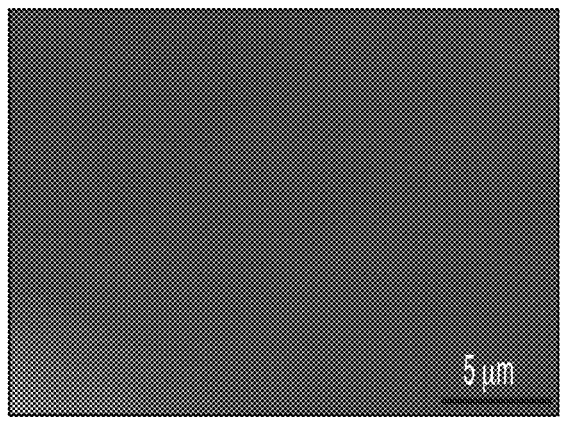
FIG. 15B is an SEM image showing a magnified view of the SEM image of FIG. 15A.
Figure 15C:
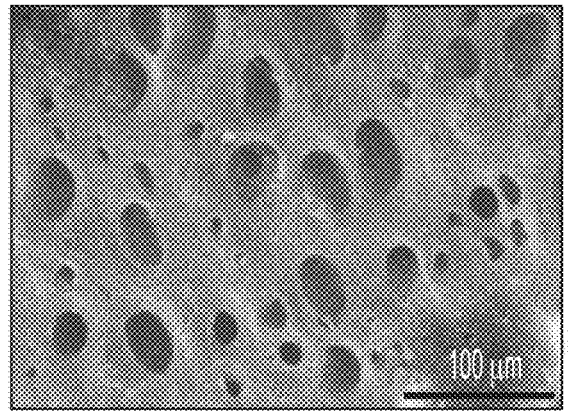
FIG. 15C is an SEM image of a hydrogel after exposure to a TSB/PBS solution, according to one example.
Figure 15D:
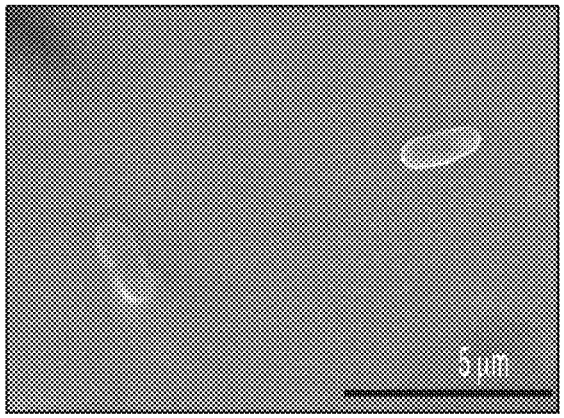
FIG. 15D is an SEM image showing a magnified view of the SEM image of FIG. 15C.

FIGS. 15A-15D shows SEM images of the cross-sectional morphology of freeze-dried hydrogels submerged in a solution of DI water (15A and 15B) and hydrogels submerged in 100% TSB inoculated with *E. coli* (15C and 15D). Images at low magnification (15A and 15C) show a dense network of crosslinked AA and AM monomers, with pores between 10 μm and 50 μm in diameter. FIG. 15B shows the clean surface of a hydrogel after swollen in DI water. FIG. 15D shows the presence of bacteria on the surface of the hydrogel submerged in a bacterial solution. These images confirm that *E. coli* were able to attach themselves to the solid polymer network of the hydrogel. The high porosity of the developed super absorbing hydrogels allows for flow of fluids containing bacteria through its matrix as well as easy entrapment within the bound fluid in the hydrogel.

In another example, the device's ability to effectivity sample bacteria was validated by introducing devices into a culture solution to simulate the gut bacterial flora in a GI environment. The capsules ability to protect the sampled bacteria after activation and sealing was tested in different extreme environments that directly affect the bacterial growth and survival rate upon direct contact. For this test, three fully assembled (but not yet activated/sealed) capsules and three bare hydrogel samples, were immersed in a solution of 100% Tryptic Soy Broth (TSB, Sigma Aldrich)

containing *Escherichia coli* and incubated for eight hours at 37° C. During the incubation period, the bacteria within the culture media were captured within the hydrated hydrogel matrix inside the capsule and the bare hydrogel samples. Next, one activated/sealed capsule and one bare hydrogel sample were removed from the bacteria culture solution and immersed into a first solution including PBS. Another activated/sealed capsule and one bare hydrogel sample were removed from the bacteria culture solution and immersed into a second solution including 1000 µg/mL of Tobramycin (antibiotic) prepared in PBS. The third activated/sealed capsule and bare hydrogel sample were removed from the bacteria culture solution and immersed into a third solution of bleach diluted at a 1:10 ratio in DI water. PBS was used as a biocompatible media and as a control experiment. Tobramycin and bleach solutions were used to validate the effectiveness of the sealing mechanism of activated capsules in protecting the sampled bacteria against extreme hostile environments. Bare hydrogel samples with captured bacteria were used as a control to assess the survival rate of the sampled bacteria upon direct exposure to the three conditions. The capsule and bare hydrogel pairs were kept in each of the three test solutions for one hour; the samples were then removed from the solutions and the number of viable bacteria counts for each condition was assessed. The captured bacteria were extracted by unscrewing the two parts of the capsule and removing the loaded hydrogel using a sterile inoculation loop and placing it into 10 mL of 100% TSB solution. Bare hydrogel samples with captured bacteria were also transferred directly into separated 10 mL vials of TSB solution. The captured bacteria within all hydrogel samples were extracted into the TSB solution by incubating them for 20 minutes at 37° C. under mechanical agitation. The number of viable bacteria within the hydrogel samples was determined by plating the extracted solution onto trypticase soy agar plates and counting the number of Colony Forming Units (CFU).

Figure 16:
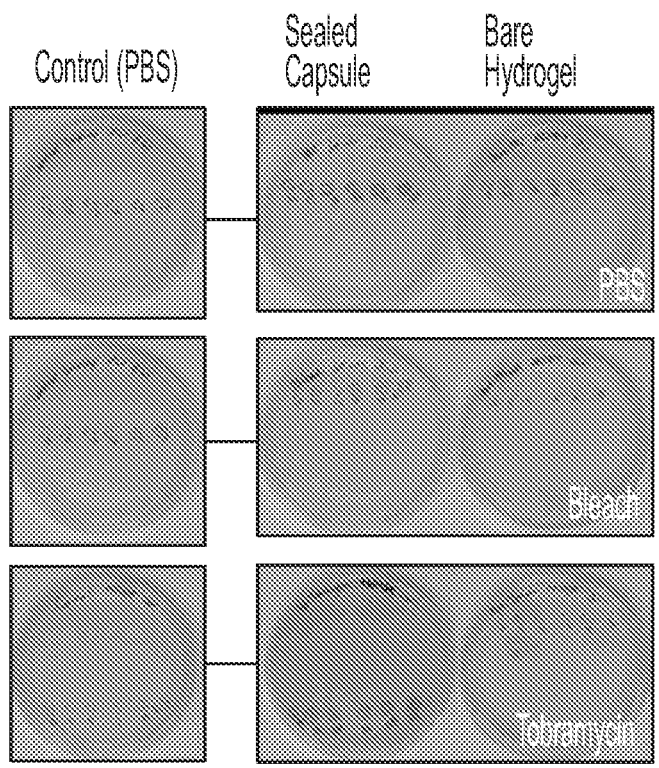
FIG. 16 shows photographs of TSB/agar plates with CFU counts for hydrogels and sealed capsules exposed to different solutions, according to one example.
Figure 17:
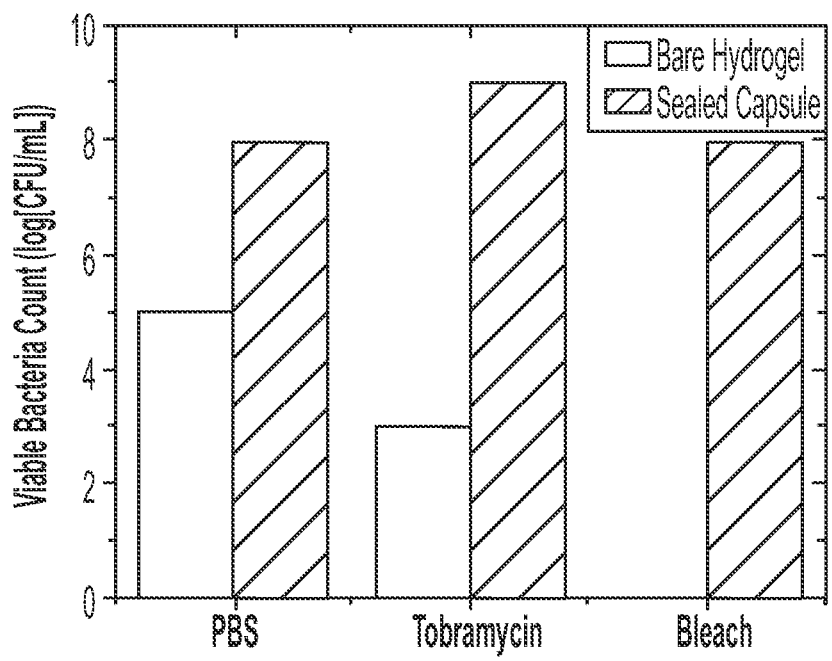
FIG. 17 is a bar graph showing the CFU/ml counts for the hydrogels of FIG. 16.

FIG. 16 shows photographs of TSB/agar plates with bacterial colonies collected from the bare hydrogel and sealed capsule in different solutions. The bacterial concentration of the stock solution used for the different experiments is shown on the left. The actual CFU counts are shown in FIG. 17 for each condition. In this plot, one bar represents the CFU/mL of bare hydrogels after exposure, while the other bar one represents the CFU/mL of hydrogels within a sealed capsule. Solutions inoculated with bacteria from the bare hydrogels have lower concentrations than those coming from hydrogels within sealed capsules across all conditions. For hydrogels submerged in PBS, the number of CFU/mL drops three orders of magnitude when comparing bare hydrogels and hydrogels within the sealed capsule. PBS is commonly used as media for long-term storage of bacteria due its biocompatibility and preservative properties. Based on this result, there is a decrease in bacterial concentration due to dilution of the initial sample collected with the bare hydrogel as it is introduced to a different solution. Despite any decrease due to dilution, there is a more obvious decline in bacterial concentration in hydrogels immersed in a solution containing Tobramycin and bleach. The number of CFU/mL drops six orders of magnitude, twice the decrease in PBS, when introduced to Tobramycin. Tobramycin, which is an aminoglycoside antibiotic, can inhibit 92% of *E. coli* strains at concentrations as low as 6.25 µg/mL. Based on the inhibitive capacities of Tobramycin, the steep decline in bacterial concentration is expected. At the same time, the higher concentration of bacteria from hydrogels within the sealed capsule suggests that the sealing mechanism protected the hydrogel from interacting with the antibiotic, as well as suggesting that the hydrogel provides a hospitable environment for bacterial concentrations to remain for long periods of time.

The results for hydrogels in bleach further confirm the seal's efficacy as well as the hydrogel's biocompatibility. Bleach is a strong sterilizing chemical, which is able to completely kill most bacterial strains within 10 minutes of exposure. The potent antimicrobial properties of bleach inhibited microbial growth to the point where no colonies formed on the culture plates (FIG. 16, middle images), thus no bar is shown for bare hydrogels submerged in bleach in FIG. 17. The fact that the bacteria within the sealed capsule are able to survive such a harsh environment demonstrates the capsule's capacity to protect samples held within the hydrogel in less harsh environments in the digestive tract.

By readily collecting samples from the GI tract and being able to protect the microbial samples within their matrix, using a fast absorbing hydrogel proves an effective sampling agent for this device. The simple design and passive sampling/sealing mechanism allows for low-cost manufacturing and easy reproducibility. This in turn results in an accessible tool for sampling currently non-accessible sections of the GI tract, which will further develop our understanding of how the gut microbiota can be used as an indicator of health.

Study II
Device Design and Assembly

In one example, a device for passive sampling of the gastrointestinal tract for calprotectin was manufactured using 3D printing. The device consisted of four components: a biodegradable enteric coating, a 3D printed housing including a first housing portion and a cap, a sampling hydrogel, and a gas-permeable polydimethylsiloxane (PDMS) membrane (see FIGS. 2-3). The 3D printed housing was designed with SolidWorks (Dassault Systèmes) and printed using a Form 2 printer (FormLabs) via stereolithography with a layer thickness of 50 µm using a biocompatible resin (EN-ISO 10993-1:2009/AC: 2010, USP Class VI) purchased from Formlabs. After 3D printing, the models were rinsed in 99% pure isopropyl alcohol (IPA) for 15 minutes to remove any remnants and then post-cured in a UV photocuring device (Formlabs Inc.) for 60 minutes to complete the polymerization. The final outer diameter and length of the capsule were 9 mm and 15 mm, respectfully. The inner diameter and the inner length were 5.6 mm and 13 mm, respectfully. Each capsule was designed to contain the sampling hydrogel and the PDMS membrane placed between the hydrogel and the sampling aperture formed in the cap. The sampling aperture was 4 mm in diameter.

The PDMS membrane was fabricated using a standard 1:10 ratio of curing agent to silicone base (Dow Corning) and cured at 70° C. for four hours. A computer-controlled $CO_2$ laser (10.6 µm wavelength) cutting and engraving system (PLS6MW, Universal Laser, Inc., Scottsdale, AZ) was used to cut discs (5.5 mm in diameter and 2 mm in height).

pH-Sensitive Polymer Enteric Coatings

The gastrointestinal tract pH generally varies from 1 to 7.5. The inventors have recognized that anionic polymers containing carboxyl groups are insoluble at stomach low pH but soluble at intestinal neutral pH, and therefore may be used as enteric coatings on sampling devices to actuate selective sampling through the gastrointestinal tract.

The dissolution behavior of five pH-sensitive polymers within different pH solutions were analyzed: (1) poly methacrylic acid-co-ethyl acrylate (Eudragit® L100-55, Evonik, New Jersey) ("L100-55"), (2) poly methacrylic acid-comethyl methacrylate (Eudragit® L100, Evonik, New Jersey) ("L100"), (3) hydroxypropyl methylcellulose phthalate (HP-55) polymer (G. M. Chemie Pvt. Ltd, India) ("Chemie"), (4) a second HP-55 polymer (Shin-Etsu Chemical Co., Japan) ("Shinetsu"), and (5) cellulose acetate phthalate (CAP) (G. M. Chemie Pvt. Ltd, India) ("CAP"). L100-55, Chemie and Shinetsu have dissolution pH thresholds of 5.5, whereas L100 has a dissolution pH threshold of 6.

The polymer films were fabricated using solution coating techniques. For the L100-55 and L100 polymers, EUDRAGIT® powder (3.8 g) was dissolved in isopropyl alcohol (IPA) (9.5 g) and acetone (6.32 g) by vortexing for 10 minutes followed by a one-hour water bath sonication (Model 2510, Branson, Danbury, CT). Once the powder was fully dissolved, triethyl citrate (TEC) (0.38 g; Sigma-Aldrich) was added as plasticizer and the solution was agitated for 2 minutes. For the Chemie and Shinetsu polymers, methacrylic acid—methyl methacrylate copolymer powder (1.29 g) was dissolved in water (3.716 g) and ethanol (14.864 g; Sigma-Aldrich) by vortexing for 15 minutes followed by a 30-minute water bath sonication. Once fully dissolved, Triethyl citrate (TEC) (0.129 g) was added to the solution and agitated for 2 minutes. For the CAP polymer, CAP powder (1.42 g) was dissolved in water (0.547 g) and triacetin (355 g; Sigma-Aldrich) by vortexing for 15 minutes followed by a 30-minute water bath sonication. To calculate a calibration curve and measure the polymer dissolution over time, methylene blue (40 mg; Sigma-Aldrich) was added into each polymer solution to enhance visualization.

Doctor blade coating techniques were used to form thin polymer films (MSK-AFA-II, MTI, USA). Each polymer solution was spread onto an acrylic sheet substrate using a doctor blade and sintered at 70° C. for 4 hours. A 0.5 mm gage blade (Precision Brand) was used for the L-100, L-100-55, and CAP solutions while a 1.25 mm gage blade was used for the Chemie and Shinetsu solutions to form dried films with 50 μm thickness. Once the films were completely dry, 10-mm coated discs were cut using $CO_2$ laser cutter machine and introduced into pH buffer solutions. Samples in triplicates were collected at 10-minute intervals and UV-Visible spectroscopy of each sample was performed using a BMG Clariostar plate reader (BMG Labtech, Germany).

Calibration curves for each polymer were obtained using separate containers filled with 40 mL of pH 7.4 representing 25%, 50%, 75%, and 100% dissolution. One disc was placed in the container representing 25% dissolution, two discs were placed in the container representing 50% dissolution, three discs were placed in the container representing 75% dissolution, while four discs were placed in the container representing 100% dissolution. All containers were sealed and covered with aluminum foil to avoid photodegradation of the dye and then placed on a shaking platform for complete dissolution. Once the disc was entirely dissolved, 200 μL of each container was administered into a 96 well plate and the absorbance was measured via the BMG Clariostar plate reader. A calibration curve was calculated for each polymer in pH 7.4 buffer media at the methylene blue maximum wavelength ($\lambda_{max}$=666 nm). The absorbance of blank buffer media was measured and subtracted from those of the dye-loaded polymer to remove any interference.

Next, for the dissolution experiment, four coated discs from each polymer solution were submerged into 40 mL of various pHs including 1.2 and 3.0 (mimicking the gastric acidic environment of the stomach in fast and fed modes), and pH 6.8 (mimicking the pH of the small intestine). Similar to the methods used to obtain the calibration curves, the containers were sealed and covered with aluminum foil to avoid photodegradation of the dye. At 10-minute intervals, 200 μL of the solution was transferred into a 96 well plate and the absorbance values were measured by UV-VIS spectrometer. The absorbance data were converted into dissolution percentage over time by comparing with the dissolution curves for each polymer obtained previously. FIGS. 18A-C show the dye release profile for each polymer coating in pH of the stomach (pH 1.2 for fasting and pH 3.0 for feeding modes) and the small intestine (pH 6.8).

The dissolution profiles of the polymers in pH 1.2 (FIG. 18A) show that all the polymers remained intact, except for Chemie and Shinetsu, which started to partially dissolve after approximately 20 minutes, with a dissolution of 34±1.8% and 28±1.7%, respectively. Chemie and Shinetsu showed similar degradation in pH 3.0, whereas L100-55, CAP, and L100 showed a negligible dissolution of 10.4±2.3%, 14.2±1.0, and 14.3±2.1%, respectively which still prevents any inflow towards the capsule if exposed to the real environment (FIG. 18B). Conversely, in pH 6.8, all organic formulations except L100 (with a dissolution of 32.3±2.6), were fully dissolved within two hours (FIG. 18C). The dissolution order of the organic enteric coatings can be elaborated by pKa and backbone structure. For instance, L100 possesses higher pKa values and displays higher pH thresholds, and thus partially dissolved in pH 6.8. The water insoluble backbone of CAP resulted in slower dissolution compared to Chemie and Shinetsu. Overall, the dissolution order for the enteric coating formulations was Chemie≈Shinetsu>L100-55>CAP>L100. Since low dissolution in acidic environment and rapid dissolution in high pH condition was favorable, L100-55 was selected for further capsule experiments.

Hydrogel Synthesis and Characterization

In one example, acrylamide (4.5 g; Sigma-Aldrich) and N,N'-methylenebisacrylamide (MBA) (0.15 g; Sigma-Aldrich) as the crosslinker were dissolved in 10 mL water by vortexing the solution for three minutes at room temperature using a Signature Digital Vortex Mixer 945303 (VWR, Radnor, PA, USA). The solution was degassed thoroughly by bubbling nitrogen gas for 10 minutes to displace dissolved oxygen as polymerization inhibitor. Ammonium persulfate (0.1 g; Sigma-Aldrich) was then added into the solution as the initiator. The pre-gel solution was transferred into PDMS mold cylinders in 150 μL volumes and the mold was placed inside an isothermal oven overnight at 70° C. to form the acrylamide network and fully cure. For the swelling ratio, three dry identical hydrogels were weighed and immersed in 25 ml buffer solutions of pH 6.8 and 7.4 at 37° C. inside an incubator with a shaking platform at 100 rpm for 36 h. Hydrogels were removed from buffer solutions at 10-minute intervals and the excess buffer present on the outer surface was gently blotted by a wiper. The mass of each hydrogel was measured. The swelling ratio was defined as swelling ratio=$(W_t-W_i)/W_i$, where Wt and Wi are the weights of the swollen and dry hydrogels, respectively.

Figure 19A:
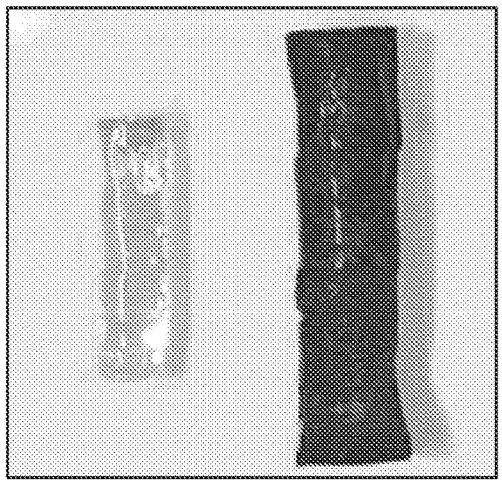
FIG. 19A is a photograph of a dry hydrogel and a 4-hour swollen hydrogel.
Figure 19B:
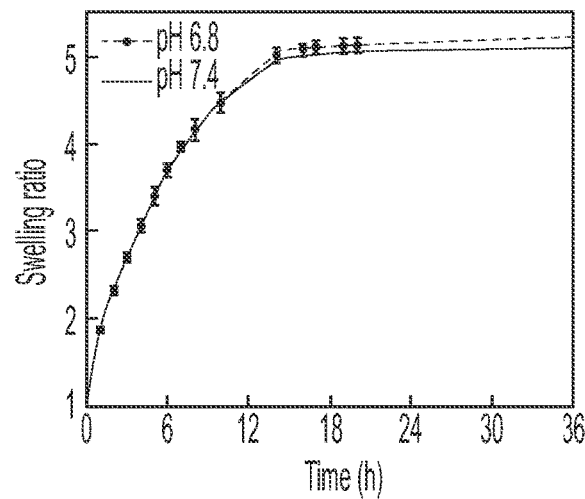
FIG. 19B is a plot showing the swelling ratio of the hydrogel in pH 6.8 and 7.4 buffer solutions over time.

In this example, the swelling kinetics of the hydrogel was investigated by measuring the swelling ratio and swelling speed. FIG. 19A shows a picture of a fully dried hydrogel (left) and a 4 h-swollen hydrogel at 37° C. in a pH 6.8 buffer solution containing methylene blue to enhance contrast (right). The results of the swelling ratio experiment, as shown in FIG. 19B, show the high diffusivity of water into preexisting or dynamically formed gaps among hydrogel chains before approaching a plateau at 14 hours. Given that the sampling time was restricted to 2 hours, swelling exceeded 130%, indicating sufficient water absorption for the hydrogel to actuate the sampling/sealing mechanism.

Figure 19C:
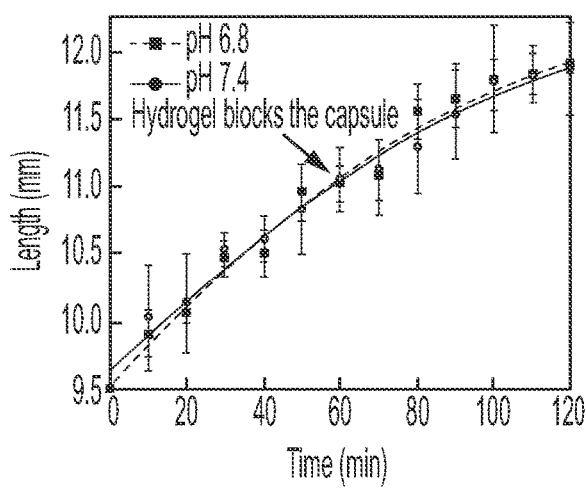
FIG. 19C is a plot showing hydrogel elongation over time.

Hydrogel elongation was also investigated to determine when the PDMS membrane would block the capsule. For the elongation experiment, the same steps were followed as for the swelling ratio experiment. The pictures were taken at 10-minute intervals and analyzed using ImageJ software to measure the length change. Results show a rapid increase in length within 60 min to move the PDMS membrane in close proximity to the sampling aperture (FIG. 19C). At this point, since the hydrogel is lengthwise confined in the capsule reservoir, it continues to apply compressive force towards PDMS membrane as the swelling continues.

Figure 19D:
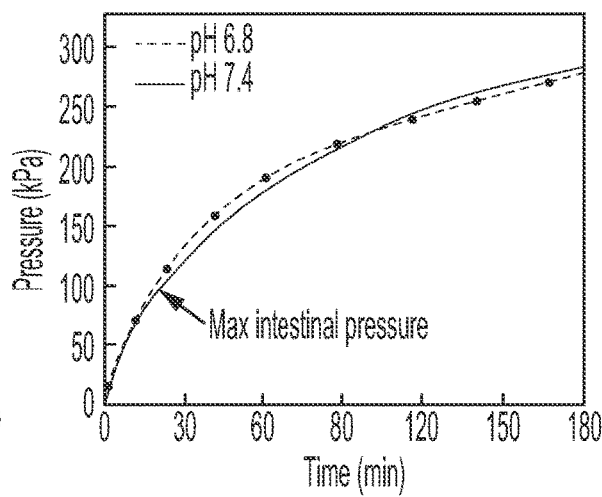
FIG. 19D is a plot showing compressive force profile of the hydrogel once it touches the PDMS membrane.

The hydrogel compressive force during swelling was recorded using an Admet Tensile Tester. A capsule with a dry hydrogel inside was placed in a container while a probe attached to a 10 N load cell was set on top of the hydrogel. The container was then filled with pH buffer solutions while being stirred with an overhead mixer (Model 50006-03, Cole Parmer, IL, USA) at 100 rpm to mimic the disturbance in the GI tract environment. The generated force for each hydrogel was recorded over time and converted into pressure based on the hydrogel cross-sectional area. Within 2 hours, the applied compression force exerted from the hydrogel exceeded 1.7 N over an area of 7.07 mm^2, which after force-pressure conversion, is sufficient force to overcome 100 kPa, the maximum intraluminal pressure. FIG. 19D demonstrates that the hydrogel could effectively surpass the maximum GI pressure after approximately 20 minutes from the time it contacts the PDMS membrane to seal the capsule and prevent fluid exchange. For all characterizations, two pH buffer solutions of 6.8 and 7.4 displayed consistently similar trend suggesting the identical hydrogel behavior towards various pH range throughout the small intestine.

Protein Sampling and Extraction

To evaluate the sampling performance of the sampling capsule, three different proteins with similar size and molecular mass were tested, including green fluorescent protein (GFP), bovine serum albumin (BSA), and calprotectin (biomarker for inflammation). GFP was selected to visually display the protein capturing within the hydrogel composition (FIGS. 20A-D).

GFP Loading and Characterization

GFP (Sigma-Aldrich, St. Louis, MO) was diluted in PBS (Sigma-Aldrich, St. Louis, MO) to achieve 100 μg/mL GFP concentration. The solution was transferred to a microcentrifuge tube and centrifuged at 14,000×g for 1 min (Sorvall Legend Micro 21 Microcentrifuge, Thermo Fisher Scientific, Waltham, MA, USA) to precipitate any GFP aggregates. The hydrogels were introduced into the GFP supernatant for 2 hours to qualitatively display the protein sampling efficiency throughout the hydrogel structure. The images were captured with a High Performance 2UV Transilluminator UVP (Upland, CA, USA) and a digital inverted microscope (AMG EVOS fl, Bothell, WA). To monitor the GFP extraction behavior of the hydrogels, they were exposed to 4 mL of PBS for 2 hours and the fluorescence analysis (excitation max at 488 nm and emission max at 510 nm) was carried out at 30 minute intervals via the BMG Clariostar plate reader. At each time point, 100 μL in triplicates were transferred into a UV-transparent 96-well microplate purchased from Corning (NY, USA) and the fluorescence was measured.

Figure 20A:
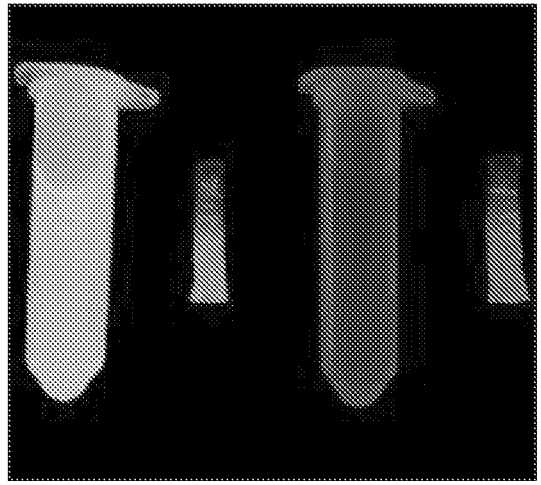
FIG. 20A is a photograph showing two microcentrifuges filled with Green Fluorescent Protein (GFP) and Deionized Water (DI) and corresponding hydrogels exposed to the solutions for two hours.
Figure 20B:
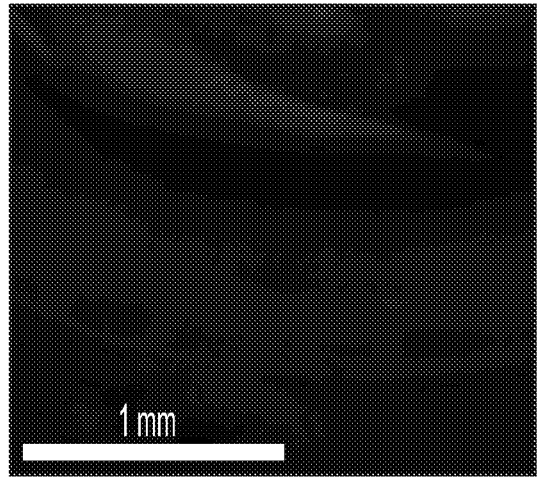
FIG. 20B is an image showing a magnified view of the control sample exposed to DI water.
Figure 20C:
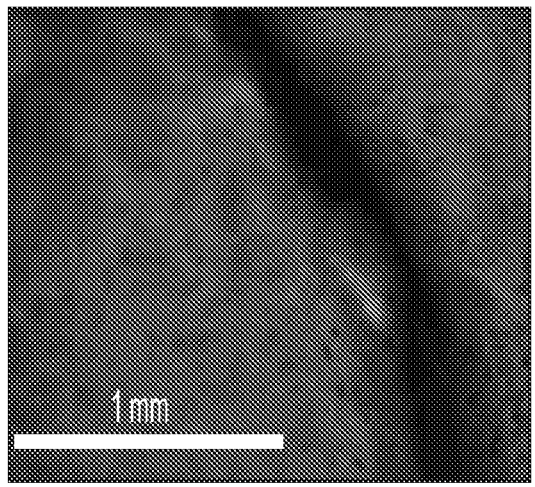
FIG. 20C is an image showing a magnified view of the sample exposed to GFP.

Due to the large hydrogel pore size, GFP with an average diameter of 5 nm, may penetrate the hydrogel matrix shown in FIG. 20A, which compares the hydrogels being exposed to GFP solution (left) and deionized (DI) water (right) under UV. Microscopic images taken from the same hydrogels also verify no color change in the sample submerged in DI water (FIG. 20B) compared to the sample exposed to GFP solution for 2 hours (FIG. 20C).

Figure 20D:
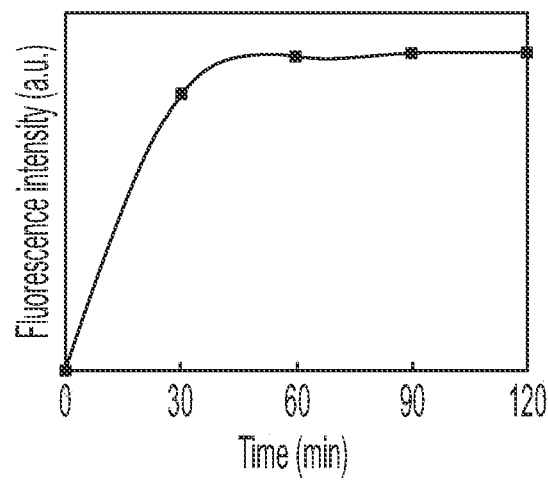
FIG. 20D is a plot showing the extraction profile of the GFP over time.

Protein extraction from the hydrogel over time was also measured. The GFP loaded hydrogel was introduced into phosphate buffered saline (PBS) and the fluorescence was measured at 30-minute intervals. The results showed a spike in fluorescence intensity within the first 30 minutes, implying a rapid protein discharge from the sample, subsequently achieving an equilibrium with relatively constant intensities (FIG. 20C). This fast protein delivery is attributed to the large voids formed within the hydrogel structure during the polymerization which facilitates the extraction process. Extraction tests confirmed the release of the GFP from the hydrogel within a 60-minute exposure to PBS (FIG. 20D).

BSA Loading and Characterization

Next, BSA protein sampling and extraction was investigated. BSA has an average diameter of approximately 7 nm. Bovine serum albumin (Sigma-Aldrich, St. Louis, MO) was diluted in PBS (Sigma-Aldrich, St. Louis, MO) twofold serially from 10 to 0.625 mg/mL for a total of 5 concentrations (10, 5, 2.5, 1.25, and 0.625 mμg/mL). Capsules with no enteric coating were immersed into BSA solutions for 2 hours at 100 rpm. Subsequently, the capsules were retrieved, disassembled, and introduced into PBS media for a 2-hour extraction. To verify the existence of BSA in the extraction PBS solution, the bicinchoninic acid (BCA) assay was used to detect the protein content. 25 μL of each standard samples and unknown samples were added into a microplate well followed by an addition of 200 μL working reagent. After incubation at 37° C. for 30 min, the plate was cooled to room temperature and then the absorbance at 562 nm was measured via BMG CLARIOstar Plus microplate reader.

Figure 21C:
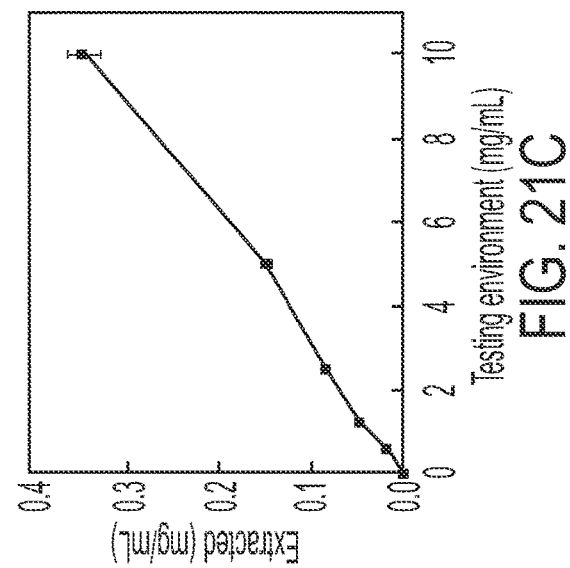
FIG. 21C is a plot showing extracted concentrations of BSA after 2 hours compared to testing environment concentrations.
Figure 21B:
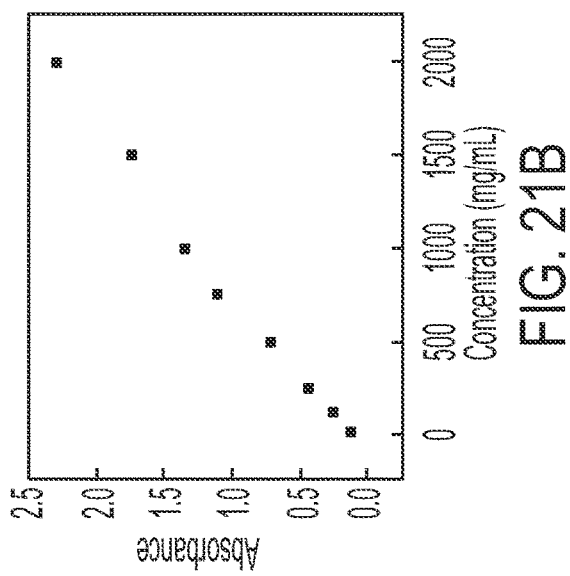
FIG. 21B is a plot showing a Bovine Serum Albumin (BSA) standard curve.
Figure 21E:
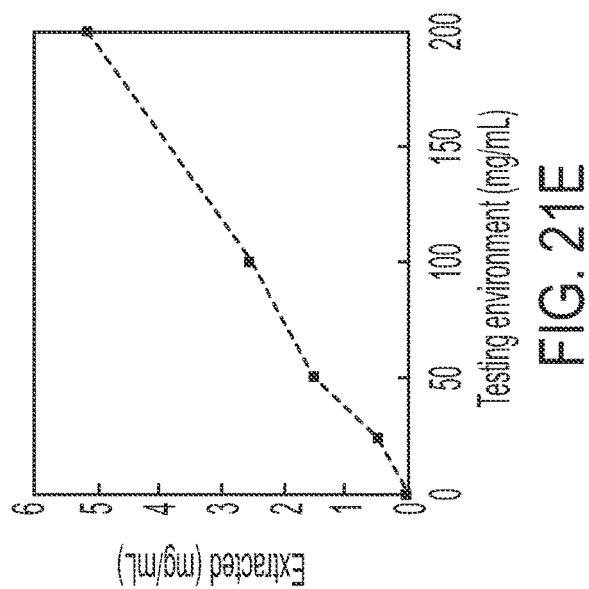
FIG. 21E is a plot showing extracted concentrations of calprotectin after 2 hours compared to testing environment concentrations.
Figure 21A:
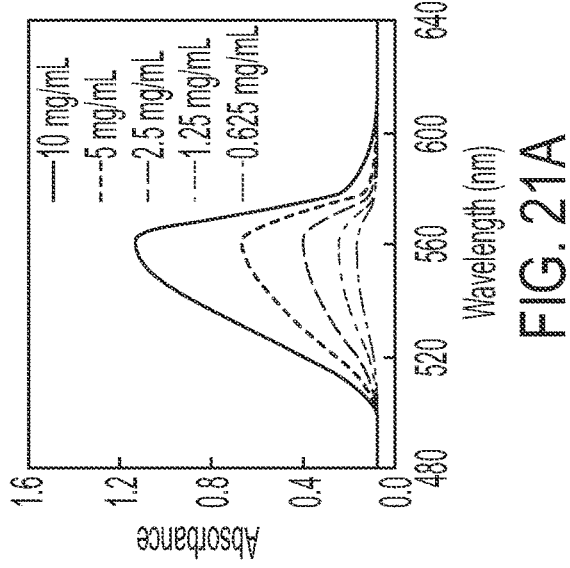
FIG. 21A is a plot showing UV-Vis absorption of 1:10 diluted testing environment concentrations with the absorbance peaks at 562 nm.

562 nm was chosen as the wavelength at which to measure absorbance because the UV-Visible spectroscopy absorption of 1:10 diluted testing environment concentrations displayed absorbance peaks at 562 nm (see FIG. 21A). To obtain a calibration curve of sampling-extraction of BSA, capsules in triplicates with no polymer coating were agitated at 100 rpm, to account for disturbance from peristalsis motion, in various testing environment concentrations for 2 hours to capture the samples. For extraction, the capsules were then retrieved, opened, and introduced into PBS for 2 hours. The total concentration of BSA in the extraction solution was determined using a bicinchoninic acid (BCA) assay. The absorbance observed at various concentrations of the extraction PBS solution are shown in FIG. 21B, while the amount of BSA extracted from capsules submerged in testing environments with different BSA concentrations are shown in FIG. 21C. As can be seen, the amount of BSA extracted displays a reliably linear trend relative to the BSA concentrations in the testing environments.

Calprotectin Loading and Characterization

Calprotectin (MyBioSource, San Diego, CA) was reconstituted in Tris buffer (20 mM Tris, 100 mM NaCl, pH 7.4) to a concentration of 1 mg/mL. The protein solution was further diluted into four different concentrations. Fully assembled capsules were immersed into 4 mL of each concentration for 2 hours while the vials were agitated at 100 rpm. The capsules were then opened, and the content was transferred into 4 mL buffer for 2-hour extraction again at 100 rpm agitation. The measurement of calprotectin was an enzyme-linked immunosorbent assay (ELISA) analyzed using the BÜHLMANN fCAL ELISA according to standard manufacturer's protocol (4-240 ng/mL). The extraction buffer was loaded onto a 96-well plate coated with a capture antibody. After 30 minutes of incubation and washing, a detection antibody conjugated to horseradish peroxidase (HRP) was added, where the detection antibodies attach to the calprotectin. After incubation and washing, tetramethylbenzidine (TMB) was added (blue color formation) and then a stop solution (change to yellow color) was added. The absorption was determined at 450 nm using BMG CLARIOstar Plus microplate reader.

Figure 21D:
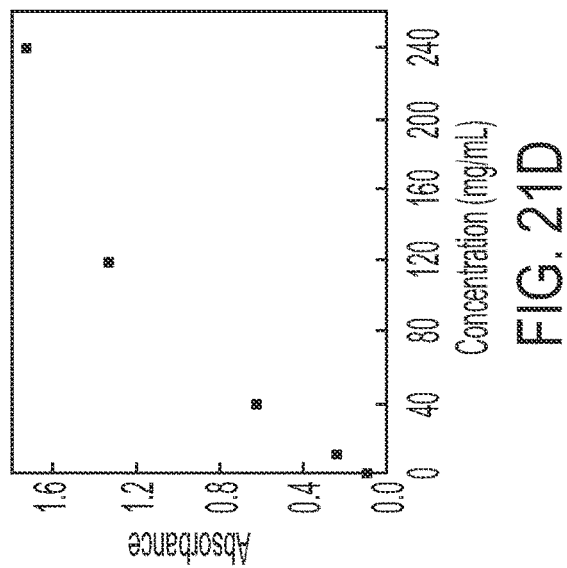
FIG. 21D is a plot showing a calprotectin standard curve.

For the extraction, the capsule content was buffer exchanged into Tris buffer for 2 hours while agitated at 100 rpm. According to the calprotectin standard curve (FIG. 21D), the extracted calprotectin concentrations were analyzed via enzyme-linked immunosorbent assay (ELISA) and compared with the testing environment concentrations (FIG. 21E). The linear trends attained from both BSA and calprotectin sampling-extraction experiments (FIG. 21C, FIG. 21E) along with the extracted concentration/testing environment concentration (E value) of 2.6% and 3.2% for BSA and calprotectin, respectively, indicate a reliable correlation between the extracted and testing environment concentrations.

In Vitro Dye Sampling

To assess the sampling performance of capsules with the real GI tract transition time, fully assembled capsules were assembled in different aqueous colors and buffers, shown in FIG. 22A (left to right): pH 7, 3, 6.8, and 7.4 shown in FIG. 22A. These pH environments assist to model the pH change along the GI tract. Based on the GI tract retention time, a group of three capsules were introduced in each pH buffer solution described earlier for 1 minute, 2 hours, 2 hours, and 18 hours, sequentially. After each time slot, the capsules were opened, and the liquid penetration or hydrogel color change was observed. The capsule opened after 2 hours of retention in the stomach (pH 3) showed intact enteric coating resulting in no hydrogel color change and no fluid content inside the housing (FIG. 22B). This evidences the efficiency of the polymer to resist dissolution in an acidic environment. Conversely, the capsule opened after 2 hours of confinement in the small intestine (pH 6.8 buffer) showed a fully dissolved enteric coating, which resulted in a swollen blue hydrogel with the buffer content inside the sampling reservoir (FIG. 22C). To assess the performance of the capsules' sealing before and after sampling, buffer absorbances were detected prior to and after introducing the capsule inside the buffers. Results revealed no peak additions (i.e., no fluid exchange), suggesting proper sealing of the capsules (FIGS. 22D-F).

In Vitro Sampling of BSA and Calprotectin

To study the capsule efficiency in sampling BSA and calprotectin, two experiments were carried out in vitro. Four different pH buffer solutions were provided: pH 7, 3, 6.8, and 7.4. Proteins were injected only inside the pH 6.8 buffer solution (the buffer solution simulating the small intestines).

Figure 23A:
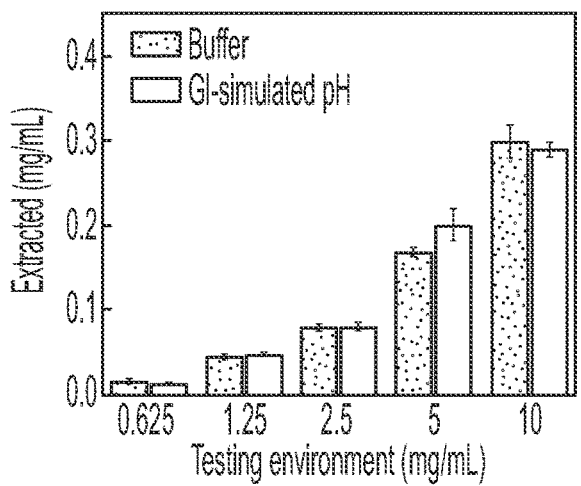
FIG. 23A is a bar graph showing the extracted concentrations of BSA in vitro.
Figure 23B:
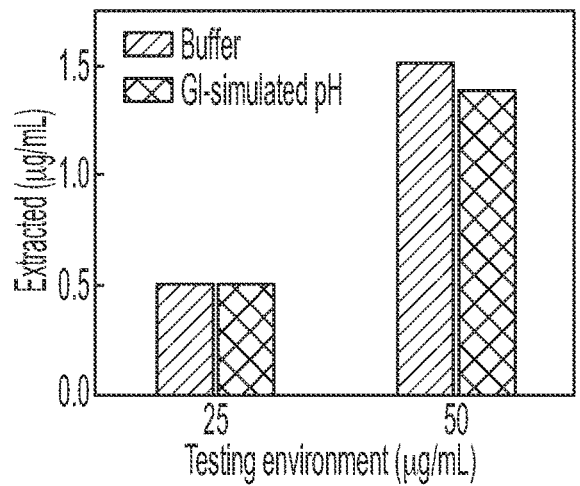
FIG. 23B is a bar graph showing the extracted concentrations of calprotectin in vitro.

As for the first experiment, BSA was used as the target analyte to sample in the pH 6.8 solution (simulating the small intestines). For all in vitro studies three capsules were use and the average of the extracted analyte was reported. After the experiment retrieved capsules, the sampled analyte in the hydrogel were extracted by removing it from the capsule and introducing it into separate PBS containing vials for 2 hours. The amount of extracted BSA from the hydrogels were determined by BCA assay and UV-vis spectroscopy which exhibited similar extracted concentrations compared to those performed in the previous buffer test conditions (FIG. 23A). For the second experiment, calprotectin was used as the targeted analyte of interest for sampling and added to the simulating small intestine (pH 6.8) solution and the output was identified through ELISA. Extracted results from testing environment concentrations with normal calprotectin levels (<100 μg/mL) matched the concentrations of the buffer experiment supporting the reliability of capsule sampling performance in the in vitro test conditions (FIG. 23B).

Ex Vivo Calprotectin Sampling

Figure 24A:
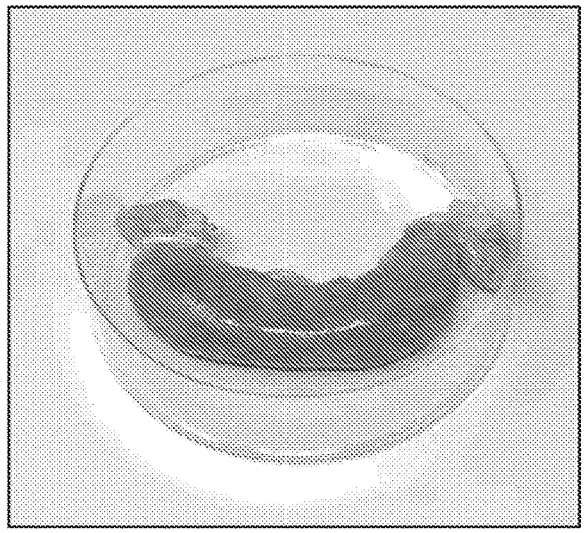
FIG. 24A is a photograph of a segment of a small intestine filled with calprotectin-loaded intestinal juice with two sampling capsules inside.
Figure 24B:
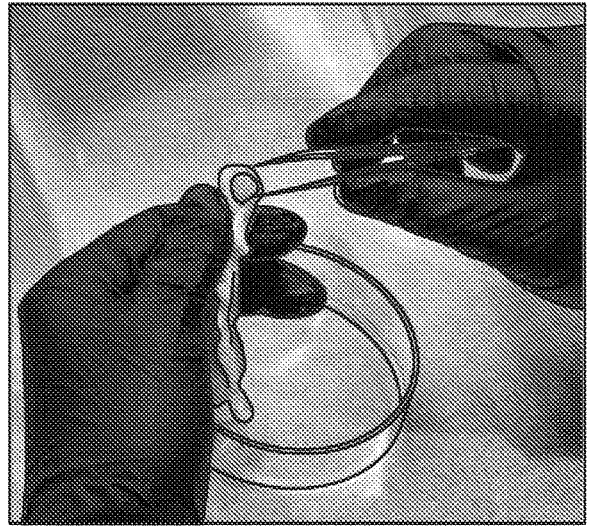
FIG. 24B is a photograph showing the retrieval of the capsules from the intestine.
Figure 24C:
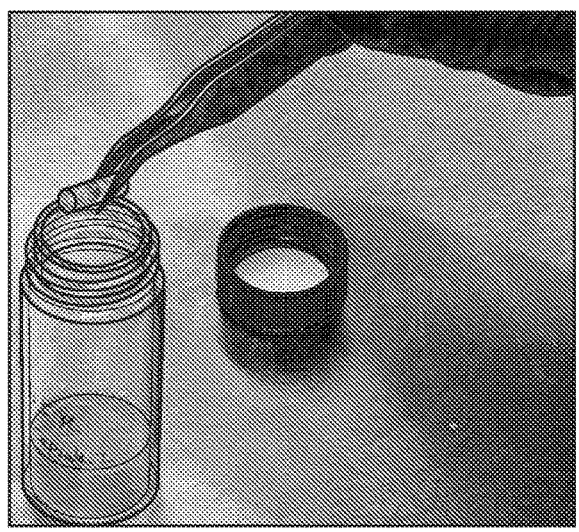
FIG. 24C is a photograph showing a disassembled capsule with sampled intestinal juice being placed in Tris buffer for 2 hours of extraction.
Figure 24D:
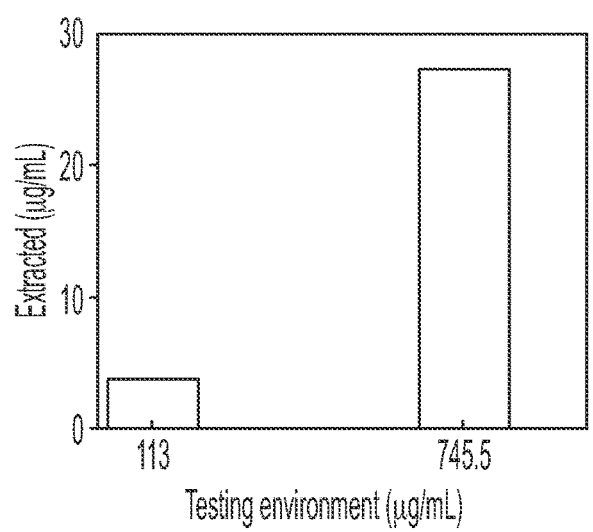
FIG. 24D is a bar graph showing extracted concentrations of two testing environment concentrations: one with low concentration of calprotectin, and one with high concentration of calprotectin.

Next, the intestinal fluid complexity's effect on the capsule's sampling performance was investigated by performing ex vivo experiments. Calprotectin was added into freshly dissected porcine small intestine followed by sampling-extraction procedure (FIG. 24A-C). FIG. 24A shows a segment of small intestine filled with calprotectin loaded intestinal juice with two sampling capsules inside. FIG. 24B shows the capsule retrieval. FIG. 24C shows a disassembled capsule with sampled intestinal juice being placed into a Tris buffer solution for 2 hours of extraction. As shown in FIG. 24D, the two testing environment concentrations were chosen such that both normal (113 μg/mL) and elevated (745.5 μg/mL) calprotectin levels were tested. The extracted values of 3.85 μg/mL and 27.5 μg/mL ex vivo shows no significant difference to the E value of 2.6% achieved in buffer and in vitro experiments. Overall, the sampling capsule appears to be a reliable device that can site specifically capture calprotectin from the small intestine and effectively protect it until the capsule is excreted from the body. In this example, the device included an enteric coating dissolution time of 1 hour after entry into the small intestine, and a hydrogel with a swelling and capsule sealing time of 1.4 hours. With the residence time of the small intestine being generally 4 to 6 hours, the average 2.4-hour sampling time was selected to permit 1.6 hours of remaining time to allow for any unwanted prolonged stages that can occur during the sampling process of the capsule inside the small intestine.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Thus, while the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A device for passive sampling of a gastrointestinal tract, the device comprising:
   a capsule housing having a first housing portion and a second housing portion that cooperate to bound a cavity;
   a sampling aperture formed in the first housing portion of the capsule housing and providing fluid communication between the cavity and an exterior of the capsule housing;
   a solution casted enteric coating covering the sampling aperture of the first housing portion, wherein the sampling aperture is formed in a recess of the first housing portion, the enteric coating is received within the recess, and degradation of the enteric coating exposes the sampling aperture to permit flow into the cavity.

2. The device of claim 1, wherein the enteric coating is configured to degrade at a predetermined location in the gastrointestinal tract.

3. The device of claim 1, wherein the enteric coating has a thickness of 50 μm.

4. The device of claim 1, wherein the enteric coating comprises materials selected from carboxylic acid groups, poly methacrylic acid-co-ethyl acrylate, poly methacrylic acid-co-methyl methacrylate, hydroxypropyl methylcellulose phthalate polymers, hypromellose phthalate, cellulose acetate phthalate, and polyvinyl acetate phthalate.

5. The device of claim 1, wherein the enteric coating has a flat outer surface.

6. The device of claim 1, wherein the enteric coating extends across only a partial portion of the capsule housing.

7. The device of claim 1, wherein the first housing portion and the second housing portion are configured to attach to each other through at least one of a screw interface, a snap fit, or an interference fit.

8. The device of claim 1, wherein the enteric coating is circular.

9. The device of claim 1, further comprising a sampling hydrogel positioned inside the cavity and a sealing member positioned between the sampling hydrogel and the sampling aperture, wherein upon exposure to a sample fluid, the sampling hydrogel is configured to absorb the sample fluid, expand within the cavity to move the sealing member into sealing engagement with the sampling aperture, and store the sample fluid for subsequent analysis.

10. The device of claim 1, wherein the solution casted enteric coating is formed by drop casting.

11. A method of manufacturing a device for passive sampling of a gastrointestinal tract, the method comprising:
providing a first housing portion of a capsule housing, the first housing portion defining a sampling aperture, and a second housing portion, wherein the first and second housing portions are configured to be assembled to form the capsule housing having a cavity, the sampling aperture providing fluid communication between the cavity and an exterior of the capsule housing;
forming an enteric coating over the sampling aperture using a solution casting technique to cover the sampling aperture, wherein the forming the enteric coating comprises
dissolving a polymer in a liquid solution to form a polymer solution;
depositing the polymer solution onto the first housing portion while the first housing portion is positioned on a holder that blocks the sampling aperture, thus preventing the polymer solution from passing through the aperture; and
drying the polymer solution to form the enteric coating over the sampling aperture.

12. The method of claim 11, wherein the solution casting technique comprises use of a doctor blade.

13. The method of claim 11, wherein the enteric coating is formed over only a portion of the capsule housing to cover the sampling aperture.

14. The method of claim 11, wherein the enteric coating is formed as a plane.

15. The method of claim 11, further comprising providing a sampling hydrogel inside the cavity, wherein upon exposure to a sample fluid, the sampling hydrogel is configured to absorb the sample fluid, expand within the cavity, and store the sample fluid for subsequent analysis.

16. The device of claim 12, wherein using the doctor blade comprises running the blade over a surface of the deposited solution before the solution dries.

17. The method of claim 11, wherein the solution casting technique comprises drop casting.

18. The method of claim 11, wherein the enteric coating is circular in shape.

19. The method of claim 11, wherein the holder is a silicone holder.

20. The method of claim 11, wherein the first housing portion and the second housing portion are configured to attach to each other through at least one of a screw interface, a snap fit, and an interference fit.

21. The method of claim 11, further comprising positioning a sampling hydrogel within at least one of the first housing portion and the second housing portion, and attaching the first housing portion to the second housing portion such that the sampling hydrogel is positioned inside the cavity.

22. The method of claim 21, further comprising placing a sealing membrane between the sampling hydrogel and the sampling aperture before attaching the first housing portion to the second housing portion.

23. The method of claim 20, wherein the enteric coating is biodegradable, such that degradation of the biodegradable coating exposes the sampling aperture to permit fluid flow into the cavity.

24. The method of claim 23, wherein the biodegradable coating is configured to degrade at a predetermined location in the gastrointestinal tract.

25. The method of claim 21, further comprising subjecting an exterior surface of the first housing portion and an exterior surface of the second housing portion to a plasma treatment to form a hydrophilic coating.

* * * * *